(12) United States Patent
Takaku et al.

(10) Patent No.: US 7,427,364 B2
(45) Date of Patent: Sep. 23, 2008

(54) LIQUID CRYSTAL COMPOSITION, LIQUID CRYSTAL ELEMENT, AND CROSS-LINKED SILOXANE POLYMER

(75) Inventors: Koji Takaku, Kanagawa (JP); Takashi Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 128 days.

(21) Appl. No.: 11/476,079

(22) Filed: Jun. 28, 2006

(65) Prior Publication Data
US 2007/0007492 A1  Jan. 11, 2007

(30) Foreign Application Priority Data
Jul. 1, 2005 (JP) ............................ 2005-194257

(51) Int. Cl.
*C09K 19/00* (2006.01)
*C09K 19/52* (2006.01)

(52) U.S. Cl. .............................. 252/299.1; 252/299.01; 252/299.63; 252/299.64; 252/299.65; 252/299.66; 428/1.1; 430/20

(58) Field of Classification Search ............ 252/299.01, 252/299.63–66, 299.64, 299.65, 299.66, 252/299.1; 430/20; 428/1.1
See application file for complete search history.

(56) References Cited

U.S. PATENT DOCUMENTS 5,679,414 A * 10/1997 Akashi et al. .......... 252/299.01

FOREIGN PATENT DOCUMENTS

| JP | 9-33894 A | 2/1997 |
| JP | 9-40955 A | 2/1997 |

OTHER PUBLICATIONS

Bucher et al., Applied Physics Letters, vol. 25, No. 4, Aug. 15, 1974, pp. 186-188.

* cited by examiner

*Primary Examiner*—Geraldina Visconti
(74) *Attorney, Agent, or Firm*—Birch, Stewart, Kolasch & Birch, LLP

(57) ABSTRACT

The present invention provides a liquid crystal composition obtained by dissolving a dichroic dye in a mixture of a cross-linked polymer having a liquid crystalline group in the side chains and a low molecular weight liquid crystal, and preferably the cross-linked polymer is a cross-linked siloxane polymer having a liquid crystalline group in the side chains, and the dielectric constant anisotropy of the liquid crystal composition is changed from positive to negative by increasing the frequency of the voltage to be applied. The present invention further provides a liquid crystal element containing the liquid crystal composition and a cross-linked siloxane polymer preferably usable for the liquid crystal composition.

17 Claims, No Drawings

LIQUID CRYSTAL COMPOSITION, LIQUID CRYSTAL ELEMENT, AND CROSS-LINKED SILOXANE POLYMER

CROSS REFERENCE TO RELATED APPLICATIONS

This application claims priority under 35U.S.C. 119 from Japanese Patent Application No. 2005-194257, the disclosure of which is incorporated herein by reference.

BACKGROUND OF THE INVENTION

1. Field of the Invention

The present invention relates to a liquid crystal composition and a liquid crystal element having a liquid crystal layer containing the liquid crystal composition; particularly a liquid crystal composition and a liquid crystal element suitably applicable to guest-host type liquid crystal element; and a siloxane polymer suitable for the liquid crystal element.

2. Description of the Related Art

With the spread of the digital technology, the importance of a paper type display for displaying digital information (hereinafter referred to as "electronic paper") has been increasing. The performance required for the electronic paper includes a high visual recognition and low electric power consumption. High visual recognition means white background similar to paper, and hence a display method based on light-scattering white background similar to paper is suited. On the other hand, as to the electric power consumption, the reflection type display system has lower power consumption as compared with that of self light-emission display system. Many systems have been proposed so far for the electronic paper. Examples include a reflection type liquid crystal display system, electrophoresis display system, magnetophoresis display system, dichroic ball rotation system, electrochromic display system, and leucothermal system. Any of these methods is not satisfactory from the viewpoint of high visual recognition, and improvement therefore has been demanded.

With reference to a liquid crystal element (liquid crystal display element), many methods have already been proposed and among them, the guest-host type liquid crystal element is expected as a liquid crystal element capable of displaying images with high visual recognition and suitable for reflection type one. A dichroic dye has a uniaxial light absorption axis and absorbs only the light rays vibrating in the light absorption axis, so that the light absorption state of a cell can be changed by changing alignment of the dichroic dye and controlling the direction of light absorption axis in accordance with the movement of the liquid crystal in electric field.

It has been known that the display contrast of the guest-host type liquid crystal element is affected by the order parameter of the dichroic dye in the liquid crystal composition, the type of a host liquid crystal, or the cell structure. In general, in the case where a liquid crystal composition containing a nematic liquid crystal and a dichroic dye in combination is set between substrates subjected to alignment treatment, since the nematic liquid crystal falls in uniaxial alignment state, only straight polarized light rays in one side are absorbed and a half of light rays are transmitted and accordingly, the display contrast ratio cannot be increased. Also, in the case where the liquid crystal composition containing a nematic liquid crystal and a dichroic dye in combination is injected between substrates which are not subjected to alignment treatment, since the nematic liquid crystal falls in a multi-domain state, only straight polarized light rays in one side are absorbed and a half of light rays are transmitted and accordingly, the display contrast ratio cannot be increased.

Therefore, as omnidirectional light absorption methods, a phase transfer method, a ¼ wavelength waveplate method, and (GH-PDLC) mode where the droplets of a guest-host liquid crystal are dispersed in a polymer have been proposed.

However, in the case of the phase transfer method, there is a problem that the impingement light spirally enters along the spiral structure due to the effect of anisotropy in refractive index of a liquid crystal used to result in decrease in the light absorbance.

In the case of the ¼ wavelength waveplate method, there is a problem that a metal reflector has to be used for preventing polarization cancellation and therefore, white background cannot be exhibited due to light scattering.

On the other hand, in the case of GH-PDLC, the axial directions are made random among the liquid crystal droplets and omnidirectional light rays can be absorbed. However, high voltage is required to move the liquid crystal restrained in a polymer network and accordingly, the display contrast ratio cannot be increased.

To solve these problems, a method of using a liquid crystalline polymer having liquid crystalline group in polymer side chain parts has been proposed. In this method, when voltage is applied, the side chain liquid crystal molecules respond, and thus the display contrast ratio is improved. The polymer main chain is preferably those having a low dielectric constant and a method of using a liquid crystalline siloxane polymer is disclosed in Japanese Patent Laid-Open (JP-A) No. 9-40955. In the mixed liquid crystal, the switching of a liquid crystal element is performed by alignment change of the liquid crystal by ON/OFF of an electric field and it is required to improve the response rate. The liquid crystalline siloxane polymer has a straight chain structure and the light absorption efficiency is not at a satisfactory level.

Means while "two-frequency driving method" for reversely changing the alignment of a liquid crystal by electric field by utilizing two-frequency drivable liquid crystal whose dielectric constant anisotropy $\Delta\in$ is changed from positive to negative was proposed in Applied Physics Letters, Vol. 25, No. 4, 186-188 (1974). In this method, since the switching off can actively be carried out, the response rate is high, and thus the method is employed for projectors.

Further, GH-PDLC using the two-frequency drivable liquid crystal is disclosed in JP-A No. 9-33894. However, the polymer is an acrylate type oligomer having no liquid crystalline group and the display contrast or the operation voltage cannot be satisfactory.

Accordingly, a liquid crystal element having a higher display contrast and a higher response rate has been desired.

SUMMARY OF THE INVENTION

The present invention has been made in view of the above-mentioned circumstances and provides a first aspect of the present invention which is a liquid crystal composition comprising a cross-linked polymer having a liquid crystalline group in a side chain, a low molecular weight liquid crystal, and a dichroic dye.

A second aspect of the present invention is a liquid crystal element comprising a pair of electrodes of which at least one is a transparent electrode and a liquid crystal layer between the pair of the electrodes, wherein the liquid crystal layer contains the liquid crystal composition according to claim 1.

A third aspect of the present invention is a cross-linked siloxane polymer comprising a repeating unit represented by the following Formula (1):

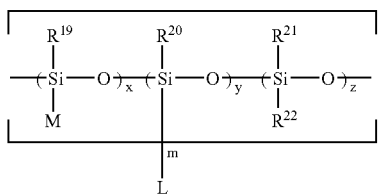

Formula (1)

wherein $R^{19}$, $R^{20}$, $R^{21}$, and $R^{22}$ each independently represent an alkyl group or an aryl group; M represents a liquid crystalline group; L represents a cross-linking group bonding a silicon atom of the siloxane polymer via a carbon atom; m represents an integer of 2 or larger; x represents a number from 1 to 100; y represents a number of 0.1 or larger; z represents a number of 0 or larger; and when x is 2 or larger, groups represented by M may be the same or different.

DETAILED DESCRIPTION OF THE INVENTION

Hereinafter, the present invention will be described more in detail.

The present invention provides a liquid crystal composition containing a cross-linked polymer having a liquid crystalline group in a side chain (the cross-linked polymer of the present invention), a low molecular weight liquid crystal, and a dichroic dye, and more particularly, a liquid crystal composition having a dielectric constant anisotropy that is changeable from positive to negative by increasing the frequency of a voltage to be applied and a liquid crystal element containing the liquid crystal composition.

The liquid crystal composition of the present invention is a liquid crystal composition containing at least one kind of the each of a cross-linked polymer that has a liquid crystalline group in a side chain and is cross-linked by a linking group (preferably a siloxane polymer as the polymer), a low molecular weight liquid crystal, and a dichroic dye. The liquid crystal composition preferably has a dielectric constant that is changeable from positive to negative by increasing in the frequency of the voltage to be applied. In the liquid crystal composition, it is preferable that at least the low molecular weight liquid crystal has a two-frequency driving property, and it is more preferable that both of the cross-linked polymer (preferably a siloxane polymer) and the dichroic dye have a two-frequency driving property.

The cross-linked polymer of the present invention is a cross-linked polymer comprising a polymer (a main chain) that has a liquid crystalline group in a side chain and is cross-linked by a cross-linking group (a linking group) and the polymer is preferably a siloxane polymer. Hereinafter, a cross-linked polymer obtained from a siloxane polymer may be referred to as the "cross-linked siloxane polymer of the present invention".

In the cross-linked polymer of the present invention, the liquid crystalline group in the side chain is not particularly limited as long as it is a group exhibiting liquid crystallinity, and it is preferably a group represented by "M" in the following Formula (1). The liquid crystalline group may exist in the polymer side chain of the cross-linked polymer and also in the cross-linking group (the linking group). The polymer main chain is preferably selected from polymethacrylates, polyacrylates, polysiloxanes, polyesters, polyethers, polyamines, and polystyrenes, and more preferably from polymethacrylates, polyacrylates, and polysiloxanes.

In conventionally disclosed liquid crystalline siloxane polymers (linear structure) having a liquid crystalline group in a side chain, it is not easy for such polymers to completely absorb omnidirectional light rays. However, in the cross-linked polymer of the present invention having the liquid crystalline group in the side chain, since the polymer is cross-linked by the cross-linking group (the linking group), it is remarkably efficient in terms of the light absorption.

As compared with polymer liquid crystals used in conventional liquid crystal compositions, the cross-linked polymer of the present invention preferably has a refractive index practically close to that of the low molecular weight liquid crystal of the liquid crystal composition of the present invention. The difference in refractive index between the cross-linked polymer and the low molecular weight liquid crystal is preferably in a range of not lower than −0.4 and not higher than 0.4, more preferably in a range of not lower than −0.2 and not higher than 0.2, and even more preferably in a range of not lower than −0.15 and not higher than 0.15. If the difference between the refractive index of the cross-linked polymer and the refractive index of the low molecular weight liquid crystal is narrowed, light scattering attributed to the difference in refractive index can be reduced, and thus the liquid crystal composition of the present invention is suitable for a guest-host liquid crystal composition.

The cross-linked polymer of the present invention is preferably a cross-linked polymer comprising a siloxane polymer as a polymer (cross-linked siloxane polymer). The siloxane polymer is a polymer including a siloxane polymer as a main chain skeleton and a liquid crystalline group in a side chain part branched from the skeleton. The "cross-linked siloxane polymer is not particularly limited but preferably comprises a repeating unit represented by the following Formula (1).

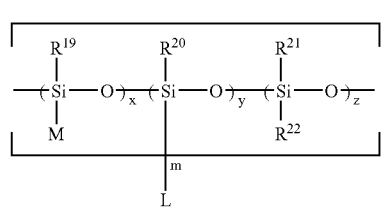

Formula (1)

In the Formula (1), $R^{19}$, $R^{20}$, $R^{21}$, and $R^{22}$ each independently represent an alkyl group or an aryl group which may have a substituent.

The alkyl group represented by $R^{19}$, $R^{20}$, $R^{21}$, and $R^{22}$ is preferably an alkyl group having preferably 1 to 30 carbon atoms, more preferably 1 to 14 carbon atoms, and even more preferably 1 to 4 carbon atoms and may be, for example, methyl, ethyl, n-propyl, isopropyl, n-butyl, sec-butyl, tert-butyl, 2-chloroethyl, and 2-cyanoethyl. The alkyl group may be linear, branched, or cyclic and they may be substituted or unsubstituted. Examples of the cycloalkyl group include cyclohexyl, cyclopentyl, 4-n-methylcyclohexyl, 4-n-ethylcyclohexyl, and 4-n-butylcyclohexyl.

The aryl group represented by $R^{19}$, $R^{20}$, $R^{21}$, and $R^{22}$ is preferably an aryl group having preferably 6 to 20 carbon atoms, more preferably 6 to 15 carbon atoms, and even more preferably 6 to 12 carbon atoms and may be, for example, phenyl, p-tolyl, naphthyl, p-cyanophenyl, p-fluorophenyl, and m-chlorophenyl. These groups may be substituted or unsubstituted.

The substituents may include a group V of following substituents.

(Substituent Group V)

Halogen atoms (e.g. chlorine, bromine, iodine, and fluorine), mercapto groups, cyano groups, carboxy groups, phosphoric acid groups, sulfo groups hydroxy groups, carbamoyl groups having 1 to 10 carbon atoms, preferably 2 to 8 carbon atoms, and even more preferably 2 to 5 carbon atoms (e.g. methylcarbamoyl, ethylcarbamoyl, and morpholinocarbamoyl), sulfamoyl groups having 0 to 10 carbon atoms, preferably 2 to 8 carbon atoms, and even more preferably 2 to 5 carbon atoms (e.g. methylsulfamoyl, ethylsulfamoyl, and piperidinosulfamoyl), nitro groups, alkoxy groups having 1 to 20 carbon atoms, preferably 1 to 10 carbon atoms, and even more preferably 1 to 8 carbon atoms (e.g. methoxy, ethoxy, 2-methoxyethoxy, and 2-phenylethoxy), aryloxy groups having 6 to 20 carbon atoms, preferably 6 to 12 carbon atoms, and even more preferably 6 to 10 carbon atoms (e.g. phenoxy, p-methylphenoxy, p-chlorophenoxy, and naphthoxy), acyl groups having 1 to 20 carbon atoms, preferably 2 to 12 carbon atoms, and even more preferably 2 to 8 carbon atoms (e.g. acetyl, benzoyl, and trichloroacetyl), acyloxy groups having 1 to 20 carbon atoms, preferably 2 to 12 carbon atoms, and even more preferably 2 to 8 carbon atoms (e.g. acetyloxy and benzoyloxy), acylamino groups having 1 to 20 carbon atoms, preferably 2 to 12 carbon atoms, and even more preferably 2 to 8 carbon atoms (e.g. acetylamino), sulfonyl groups having 1 to 20 carbon atoms, preferably 1 to 10 carbon atoms, and even more preferably 1 to 8 carbon atoms (e.g. methanesulfonyl, ethanesulfonyl and benzenesulfonyl), sulfinyl groups having 1 to 20 carbon atoms, preferably 1 to 10 carbon atoms, and even more preferably 1 to 8 carbon atoms (e.g. methanesulfinyl, ethanesulfinyl, and benzenesulfinyl), substituted or unsubstituted amino groups having 1 to 20 carbon atoms, preferably 1 to 12 carbon atoms, and even more preferably I to 8 carbon atoms (e.g. amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazoylamino, N,N-methylphenylamino, and N,N-ethylphenylamino), ammonium groups having 0 to 15 carbon atoms, preferably 3 to 10 carbon atoms, and even more preferably 3 to 6 carbon atoms (e.g. trimethylammonium and triethylammonium), hydrazino groups having 0 to 15 carbon atoms, preferably 1 to 10 carbon atoms, and even more preferably 1 to 6 carbon atoms (e.g. trimethylhydrazino group), ureido groups having 1 to 15 carbon atoms, preferably 1 to 10 carbon atoms, and even more preferably 1 to 6 carbon atoms (e.g. ureido group and N,N-dimethylureido group), imido groups having 1 to 15 carbon atoms, preferably 1 to 10 carbon atoms, and even more preferably 1 to 6 carbon atoms (e.g. succiminido group), alkylthio groups having 1 to 20 carbon atoms, preferably 1 to 12 carbon atoms, and even more preferably 1 to 8 carbon atoms (e.g. methylthio, ethylthio, and propylthio), arylthio groups having 6 to 80 carbon atoms, preferably 6 to 40 carbon atoms, and even more preferably 6 to 30 carbon atoms (e.g. phenylthio, p-methylphenylthio, p-chlorophenylthio, 2-pyridylthio, 1-naphthylthio, 2-naphthylthio, 4-propylcyclohexyl-4'-diphenylthio, 4-butylcylcohexyl-4'-biphenylthio, 4-pencylcyclohexyl-4'-biphenylthio, 4-propylphenyl-2-ethinyl-4'-biphenylthio), heteroarylthio groups having 1 to 80 carbon atoms, preferably 1 to 40 carbon atoms, and even more preferably 1 to 30 carbon atoms (e.g. 2-pyridylthio, 3-pyridylthio, 4-pyridylthio, 2-quinolylthio, 2-furylthio, and 2-pyrrolylthio), alkoxycarbonyl groups having 2 to 20 carbon atoms, preferably 2 to 12 carbon atoms, and even more preferably 2 to 8 carbon atoms (e.g. methoxycarbonyl, ethoxycarbonyl, and 2-benzyloxycarbonyl), aryloxycarbonyl groups having 6 to 20 carbon atoms, preferably 6 to 12 carbon atoms, and even more preferably 6 to 10 carbon atoms (e.g. phenoxycarbonyl), unsubstituted alkyl groups having 1 to 18 carbon atoms, preferably 1 to 10 carbon atoms, and even more preferably 1 to 5 carbon atoms (e.g. methyl, ethyl, propyl, and butyl), substituted alkyl groups having 1 to 18 carbon atoms, preferably 1 to 10 carbon atoms, and even more preferably 1 to 5 carbon atoms {e.g. hydroxymethyl, trifluoromethyl, benzyl, carboxyethyl, ethoxycarbonylmethyl, and acethylaminomethyl, and herein unsaturated hydrocarbon groups having 2 to 18 carbon atoms, preferably 3 to 10 carbon atoms, and even more preferably 3 to 5 carbon atoms (e.g. vinyl, ethinyl, 1-cyclohexenyl, benzylidinyl, and benzylidenyl) are also included in the substituted alkyl groups}, substituted or unsubstituted aryl groups having 6 to 20 carbon atoms, preferably 6 to 15 carbon atoms, and even more preferably 6 to 10 carbon atoms (e.g. phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, and 4-propylphenyl-2-ethinyl-4'-biphenyl), and substituted or unsubstituted heteroaryl groups having 1 to 20 carbon atoms, preferably 2 to 10 carbon atoms, and even more preferably 4 to 6 carbon atoms (e.g. pyridyl, 5-methylpyridyl, thienyl, furyl, morpholino, and tetrahydrofurfuryl).

These substituent group V may have a condensed structure of benzene rings or naphthalene groups and these substituents may be substituted with the above exemplified substituent group V.

The substituents of the alkyl groups and cycloalkyl groups represented by $R^{19}$, $R^{20}$, $R^{21}$, and $R^{22}$ are preferably halogen atoms, cyano groups, alkoxy groups, aryloxy groups, acyloxy groups, amino groups, ammonium groups, alkoxycarbonyl groups, aryloxycarbonyl groups, aryl groups, and heteroaryl groups among the substituent group V.

The substituents of the aryl groups represented by $R^{19}$, $R^{20}$, $R^{21}$, and $R^{22}$ are preferably halogen atoms, cyano groups, alkoxy groups, acryl groups, acyloxy groups, acylamino groups, amino groups, alkoxycarbonyl groups, aryloxycarbonyl groups, unsubstituted alkyl groups, substituted alkyl groups, aryl groups, and heteroaryl groups among the substituent group V.

The alkyl groups or aryl groups represented by $R^{19}$, $R^{20}$, $R^{21}$, and $R^{22}$ are particularly preferably methyl and phenyl.

In the Formula (1), "M" represents a liquid crystalline group. Herein, a liquid crystalline group means a structure consisting of a plurality of phenyl groups or cyclic structures and analogous to liquid crystal compounds in any phase, preferably nematic phase and smectic phase. Practical examples of liquid crystal compounds are those described in "Molecular Structure and Liquid Crystallinity", Chapter 3, Liquid Crystal Handbook, edited by Liquid Crystal Handbook Editing Society (2000) printed by MARUZEN CO., LTD.

Those preferable for a group represented by "M" are groups having dielectric constant anisotropy changeable from positive to negative by increasing in the frequency of the voltage to be applied and examples of such liquid crystal compounds similar to the groups are described in detail in Liquid Crystal Device Handbook, pp. 189-192, edited by No. 142 Committee of Japan Society for the Promotion of Science, published by Nikkan Kogyo Shimbum (1989).

Examples preferable for the groups represented by "M" are the following structure represented by the following Formula (5):

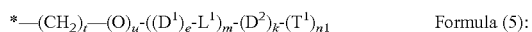

Formula (5):

wherein, * represents a portion of attaching to the siloxane polymer.

In the Formula (5), $D^1$ and $D^2$ each independently represent an arylene group, a heteroarylene group, or a divalent alicyclic hydrocarbon group which may be substituted or unsubstituted.

The arylene group represented by $D^1$ and $D^2$ may be arylene groups having preferably 6 to 20 carbon atoms, and more preferably 6 to 10 carbon atoms. Examples of the preferable arylene groups are phenylene and naphthalene. Particularly preferable examples are substituted phenylene groups and even more preferable example is 1,4-phenylene group.

The heteroarylene group represented by $D^1$ and $D^2$ may be heteroarylene groups having preferably 1 to 20 carbon atoms, and more preferably 2 to 9 carbon atoms. Examples of the preferable heteroarylene groups are heteroarylene groups formed by removing each one hydrogen atom from two carbon atoms of a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, and a triazole ring and condensed rings formed by condensing these rings.

The divalent alicyclic hydrocarbon group represented by $D^1$ and $D^2$ may be divalent alicyclic hydrocarbon groups having preferably 3 to 20 carbon atoms, and more preferably 4 to 10 carbon atoms. Examples of the divalent alicyclic hydrocarbon groups are cyclohexanediyl and cyclopentanediyl, and more preferably cyclohexane-1,2-diyl, cyclohexane-1,3-diyl, cyclohexane-1,4-diyl, and cyclopentane-1,3-diyl, and even more preferably (E)-cyclohexane-1,4-diyl.

The arylene group, heteroarylene group, and divalent alicyclic hydrocarbon group represented by $D^1$ and $D^2$ may further have a substituent and examples of the substituent are those included in the group V of the above-mentioned substituents.

In the Formula (5), $L^1$ represents a divalent linking group. The group is preferably an alkenylene group, an alkinylene group, an ether group, an ester group, a carbonyl group, an azo group, an azoxy group, an alkylene oxy group, and more preferably an ester group and an alkylene oxy group. Herein, the ester linking group may be either $-CO_2-$ or $-OCO-$.

The alkenylene group represented by $L^1$ may be alkenylene groups having 2 to 20 carbon atoms, and preferably 2 to 10 carbon atoms, and an example may be ethenylene.

The alkinylene group represented by $L^1$ may be alkinylene groups having 2 to 20 carbon atoms, and preferably 2 to 10 carbon atoms, and an example may be ethinylene.

The alkylene oxy group represented by $L^1$ may have a substituent and preferable substituents are a halogen atom, a cyano group, an alkoxycarbonyl group, a carbamoyl group, an alkyl, an aryl, and a heteroaryl. More preferable substituents are a halogen atom, a cyano group, and an alkyl and an even more preferable substituent is a halogen atom. A preferable alkylene oxy group is a difluoromethylene oxy group ($-CF_2O-$).

In the Formula (5), $T^1$ represents an alkyl, an alkoxy group, an alkoxycarbonyl, an acyl, an acyloxy group, a halogen atom, and a cyano group.

Examples of the group represented by $T^1$ are an alkyl having preferably 1 to 30 carbon atoms, more preferably 3 to 20 carbon atoms, and even more preferably 4 to 18 carbon atoms, an alkoxy group having preferably 1 to 30 carbon atoms, more preferably 1 to 20 carbon atoms, and even more preferably 1 to 18 carbon atoms, an alkoxycarbonyl having preferably 2 to 30 carbon atoms, more preferably 4 to 21 carbon atoms, and even more preferably 5 to 19 carbon atoms, an acyl having preferably 2 to 30 carbon atoms, more preferably 4 to 21 carbon atoms, and even more preferably 5 to 19 carbon atoms, an acyloxy group having preferably 2 to 30 carbon atoms, more preferably 4 to 21 carbon atoms, and even more preferably 5 to 19 carbon atoms, a halogen atom, and a cyano group.

The above-mentioned alkyl, alkoxy, alkoxycarbonyl, acyl, and acyloxy group may be substituted or unsubstituted and examples of the substituents may be those included in the group V of the above-mentioned substituents, and preferably a halogen atom (particularly chlorine atom and fluorine atom), a cyano group, a hydroxy group, an alkoxy group, and an acyl group.

Practical examples of the alkyl represented by $T^1$ are butyl, octyl, nonyl, decyl, undecyl, dodecyl, octadecyl, 4-cyanobutyl, trifluoromethyl and 3-methoxypropy.

Practical examples of the alkoxy group represented by $T^1$ are octyloxy, undecyloxy, dodecyloxy, trifluoromethoxy, and 2-methoxyethoxy.

Practical examples of the alkoxycarbonyl represented by $T^1$ are butyloxycarbonyl, octyloxycarbonyl, and dodecyloxycarbonyl.

Practical examples of the acyl represented by $T^1$ are octylcarbonyl and dodecylcarbonyl.

Practical examples of the acryloxy represented by $T^1$ are octylcarbonyloxy and dodecylcarbonyloxy.

Particularly preferable examples of the group represented by $T^1$ are an alkyl, an alkoxy, a halogen atom, and a cyano group.

"e" represents an integer of 1 to 3, and preferably 1 or 2.

"m" represents an integer of 1 to 3, and preferably 1 or 2.

"k" represents an integer of 1 to 2.

"$n^1$" represents an integer of 1 to 5, and preferably 1 or 2.

In the Formula (5), the total number of the groups represented by $D^1$ and $D^2$, that is, e×m+k, is an integer of 2 to 5, and preferably 3 to 4. If e and k are independently 2 or larger, the two or more groups represented by $D^1$ and $D^2$ may be the same or different one another and if m is 2 or larger, the two or more groups represented by $((D^1l)_e-L^1)$ may be the same or different one another.

In the Formula (5), particularly preferable combination of e, m, and k will be described below.

(i) e=1, m=2, k=1;
(ii) e=2, m=1, k=1; and
(iii) e=2, m=1, k=2;

In the Formula (5), "t" represents an integer of 2 to 20, preferably an integer of 3 to 18, and more preferably 3 to 15. "u" represents 0 or 1.

The Formula (5) more preferably shows a structure represented by the following Formula (6).

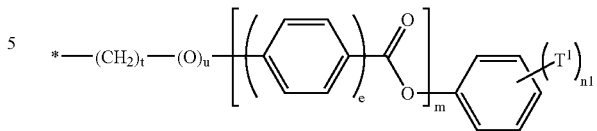

Formula (6)

In the Formula (6), t, u, e, m, $T^1$, and $n^1$ have the same meaning as t, u, e, m, $T^1$, and $n^1$ in the Formula (5) and the preferable ranges of them are also the same.

The Formula (5) further more preferably shows structures represented by the following formulae (6-1) to (6-12).

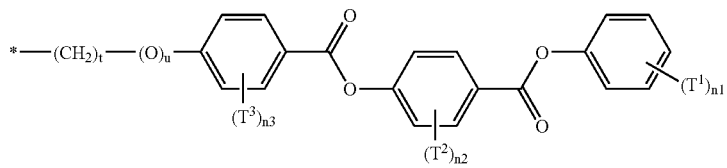

Formula (6-1)

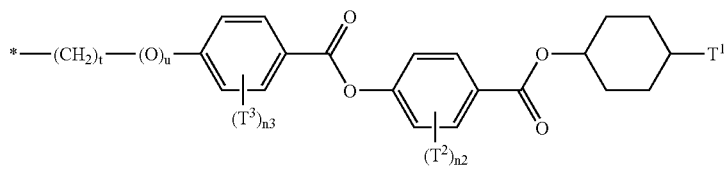

Formula (6-2)

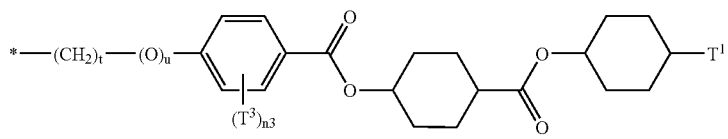

Formula (6-3)

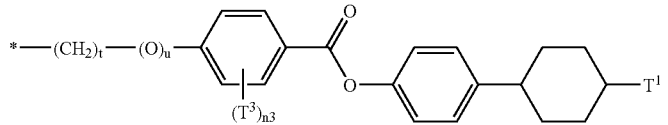

Formula (6-4)

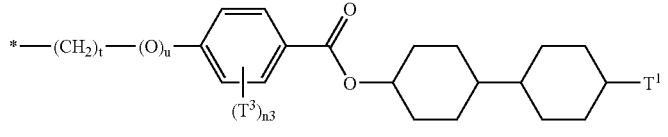

Formula (6-5)

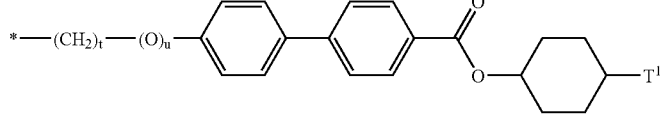

Formula (6-6)

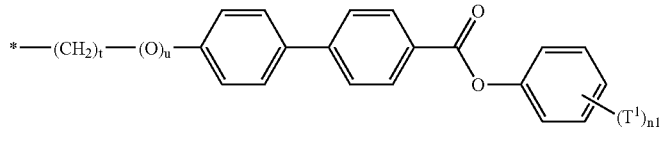

Formula (6-7)

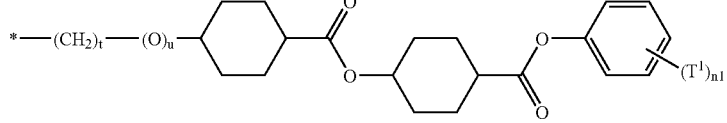

Formula (6-8)

-continued

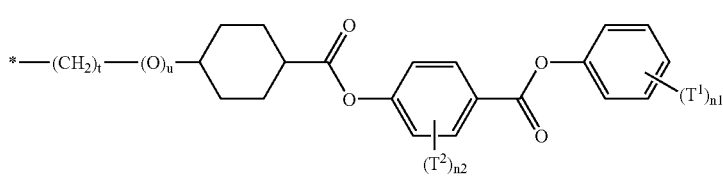

Formula (6-9)

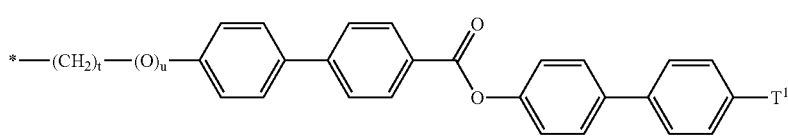

Formula (6-10)

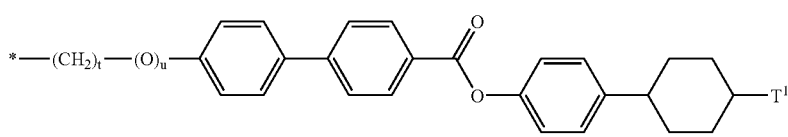

Formula (6-11)

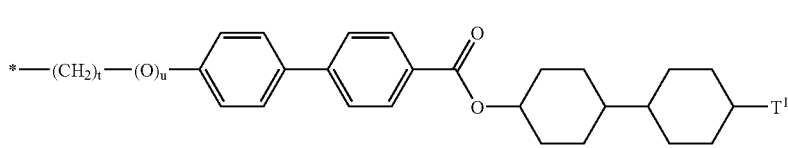

Formula (6-12)

In formulae (6-1) to (6-12), t, u, e, m, $T^1$, and n1 each have the same meaning as t, u, e, m, $T^1$, and n1 in the Formula (5) and the preferable ranges of them are also the same. $T^2$ and $T^3$ each independently represent a halogen, a cyano, an alkoxy, and an alkyl, and preferably a halogen and a cyano. "$n^2$" and "$n^3$" each independently represent an integer of 1 to 4, and preferably an integer of 1 to 2.

In the Formula (1), L represents a cross-linking group and may have any structure, and a method of producing a preferable cross-linked structure may be a synthesis method carried out by hydrosilylation a polysilane compound having Si—H groups and a polyfunctional compound having unsaturated bonds at the terminals (cross-linkable compound); a method carried out by causing reaction of a polyfunctional reactive group-containing compound by using a hydroxyl, a carboxyl, or an amino group introduced into a polymer by the hydrosilylation; and a method of radiating heat, ultraviolet rays, or radiation beam.

The silicon atoms of a siloxane polymer are bonded with carbon atoms by these methods.

In the Formula (1), "L" represents a cross-linking group with m-valence and herein, "m" represents an integer of 2 to 10, preferably an integer of 2 to 8, and even more preferably an integer of 2 to 6. Herein, "-valence" means the total number of the carbon atoms possible to be bonded with a silicon atom of the siloxane polymer.

Preferable examples of cross-linking group represented by L have a structure represented by the following Formula (7).

$$(L^2)\text{-}[(O)_y\text{—}(CH_2)_s\text{—}*]_m \quad \text{Formula (7):}$$

wherein * represents a portion of attaching to the siloxane polymer.

In the Formula (7), "s" represents an integer of 2 to 30, preferably an integer of 3 to 20, and more preferably an integer of 3 to 15.

In the Formula (7), "u" represents 0 or 1.

In the Formula (7), "m" has the same meaning as the above-mentioned "-valence" and represents an integer of 2 to 10, preferably an integer of 2 to 8, and more preferably an integer of 2 to 6.

In the Formula (7), "$L^2$" represents an alkylene group, an ether group, an arylene group or a combined group of these groups.

The alkylene group represented by $L^2$ may be an alkylene group having preferably 3 to 30 carbon atoms, more preferably 4 to 20 carbon atoms, and even more preferably 4 to 18 carbon atoms.

The ether group represented by $L^2$ may be an ether group having preferably 4 to 50 carbon atoms, more preferably 6 to 40 carbon atoms, furthermore preferably 8 to 30 carbon atoms, and even more preferably a group represented by the following Formula (8).

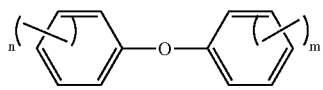

Formula (8)

In the Formula (8), "n", and "m" each independently represent an integer of 1 to 5, preferably an integer of 2 to 4, and more preferably an integer of 1 to 3.

In the Formula (7), the arylene group represented by $L^2$ may be an arylene group having preferably 4 to 50 carbon atoms, more preferably 6 to 40 carbon atoms, furthermore preferably 8 to 20 carbon atoms, and even more preferably a group represented by the following Formula (9).

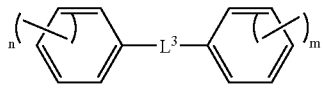

Formula (9)

In the Formula (9), "n", and "m" each independently represent an integer of 1 to 5, preferably an integer of 2 to 4, and more preferably an integer of 1 to 3. "$L^3$" in the Formula (9) may be a single bond or an alkylene group having 1 to 20 carbon atoms, more preferably a single bond or an alkylene group having 1 to 10 carbon atoms, and even more preferably a single bond or an alkylene group having 1 to 7 carbon atoms, In the Formula (1), "x" represents a number from 1 to 100, and preferably 3 to 50: "y" represents a number of 0.1 or more, and preferably 0.1 to 10, and more preferably 0.1 to 5. z represents a number from 0 to 100, more preferably 0 to 50, and even more preferably 0 to 30.

In the case where x is 2 or larger, the groups represented by M may be the same or different and groups represented by $R^{19}$ may also be the same or different. In the case where y is 2 or larger, groups represented by $R^{20}$ may also be the same or different. In the case where z is 2 or larger, groups represented respectively by $R^{21}$ and $R^{22}$ may also be the same or different.

Herein, when z is 0, the formula stands for a homopolymer, and when z is not 0, the formula stands for a copolymer.

The molecular weight of the cross-linked polymer (including the cross-linked siloxane polymer) of the present invention is not particularly limited and the number average molecular weight is preferably in a range from 1,000 to 1,000,000, and more preferably in a range from 5,000 to 300,000. The cross-linked polymer of the present invention may be a homopolymer or a copolymer.

Hereinafter, practical examples of the cross-linked polymer (cross-linked siloxane polymer) will be shown, however it is not intended that the present invention be limited to the exemplified polymers.

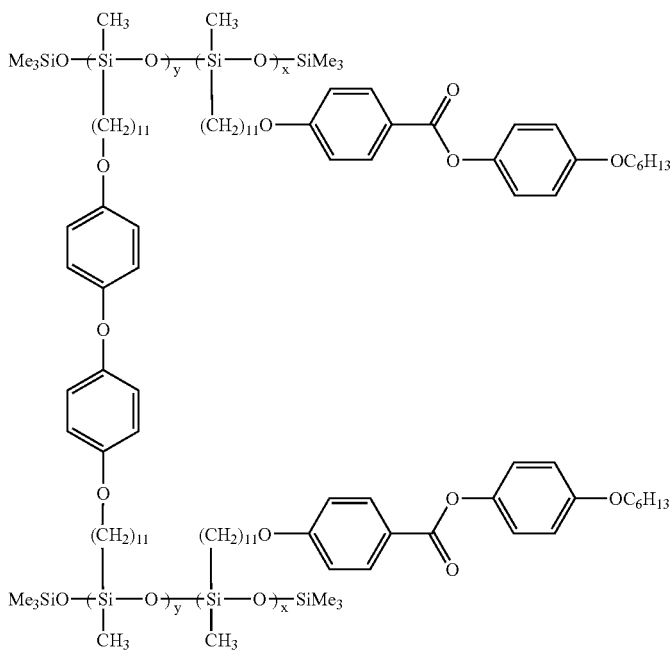

(1)

x + y = 35
x:y = 17.5:1

-continued
(2)
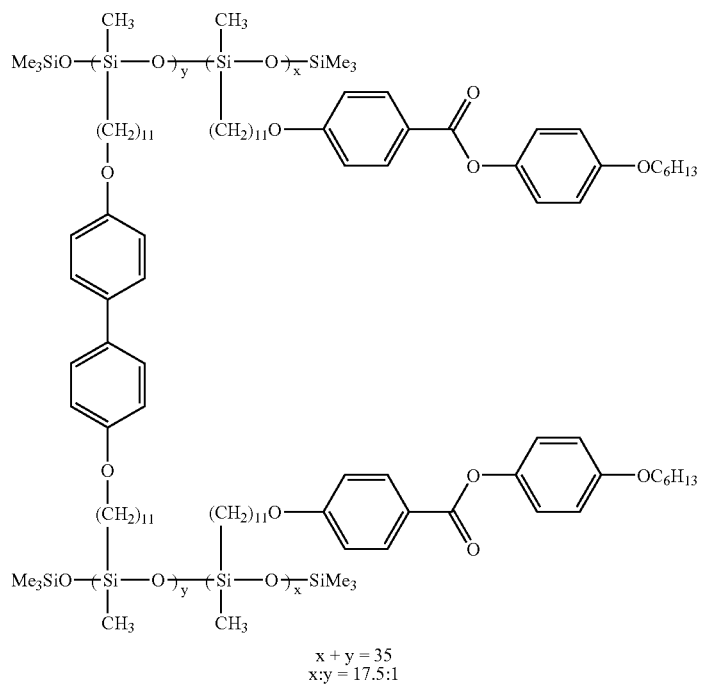
(3)
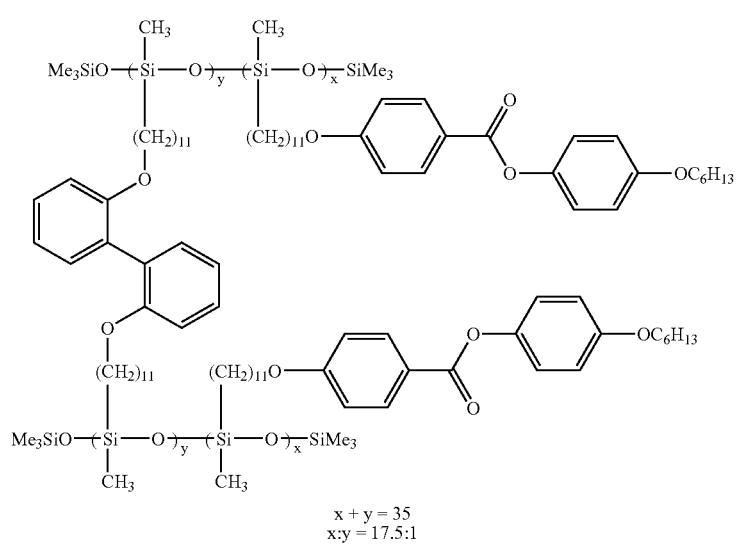

-continued
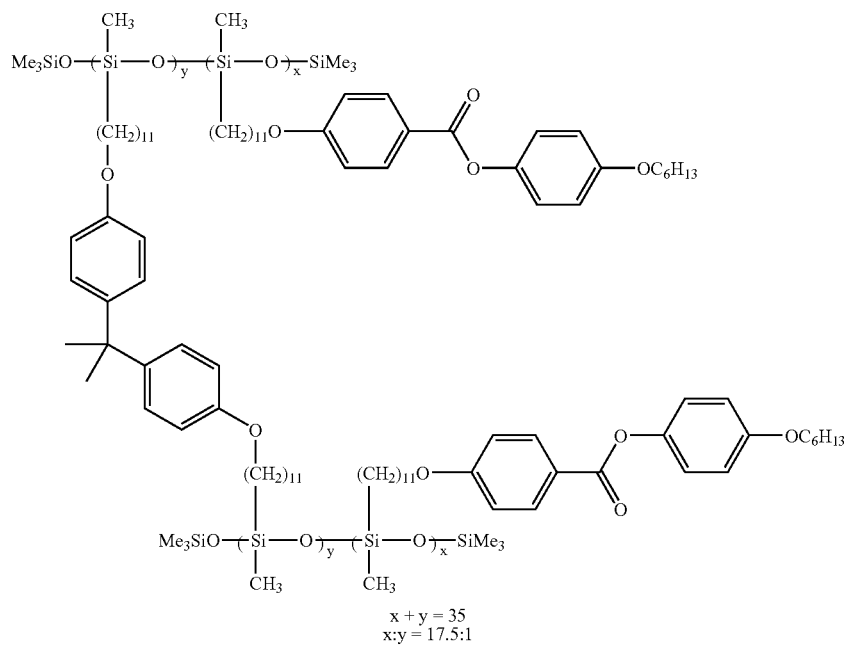
(4)
x + y = 35
x:y = 17.5:1
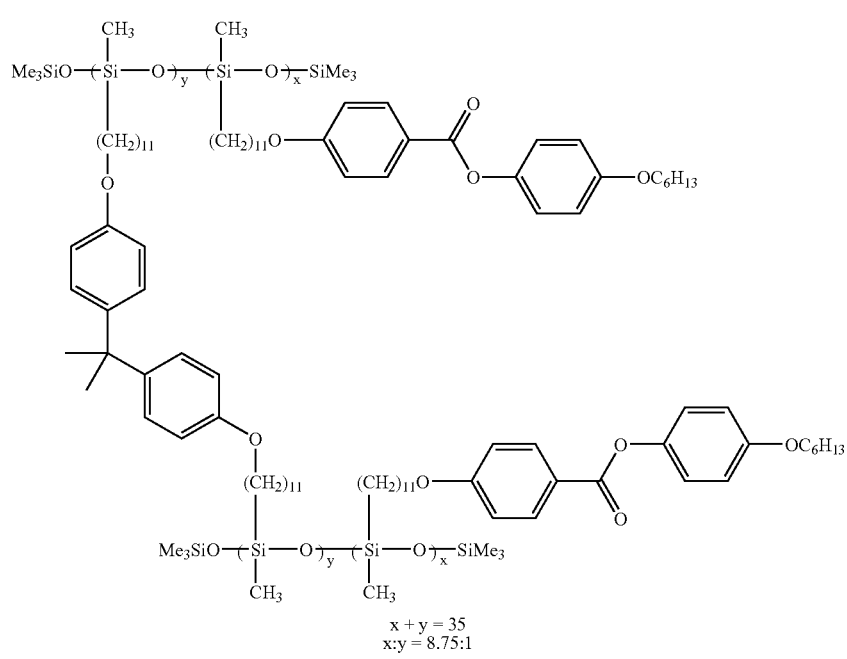
(5)
x + y = 35
x:y = 8.75:1

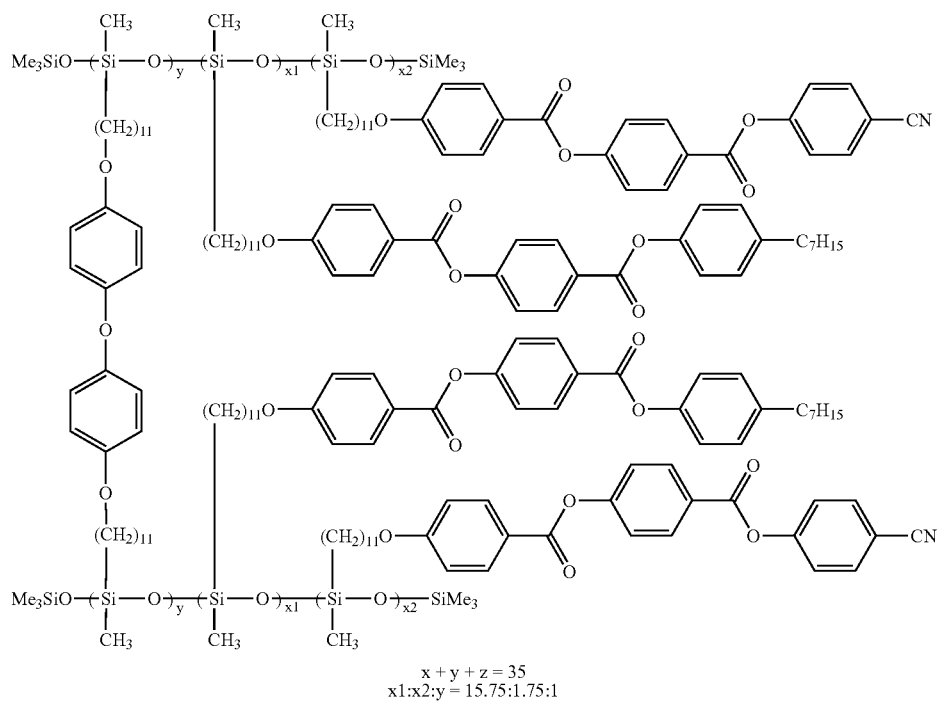
(6)
$x + y + z = 35$
$x1:x2:y = 15.75:1.75:1$
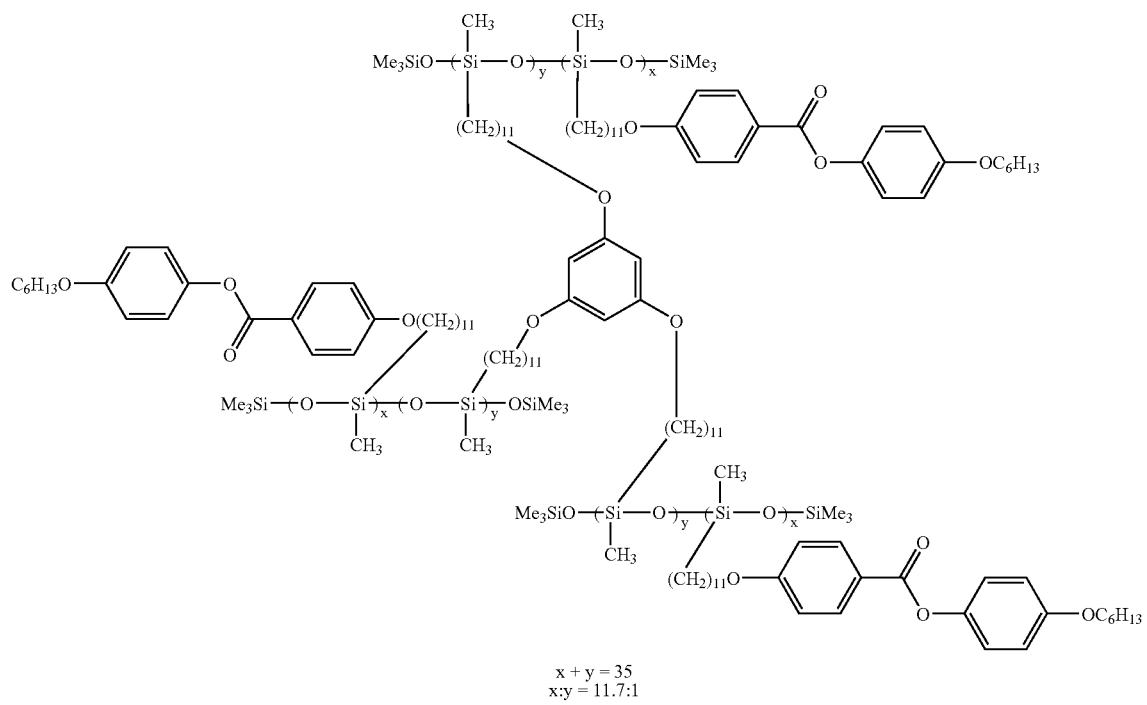
(7)
$x + y = 35$
$x:y = 11.7:1$ (8)
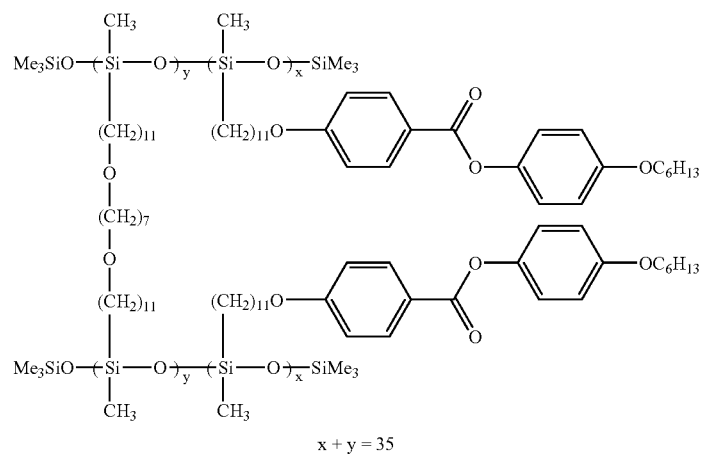
x + y = 35
x:y = 8.16:1
(9)
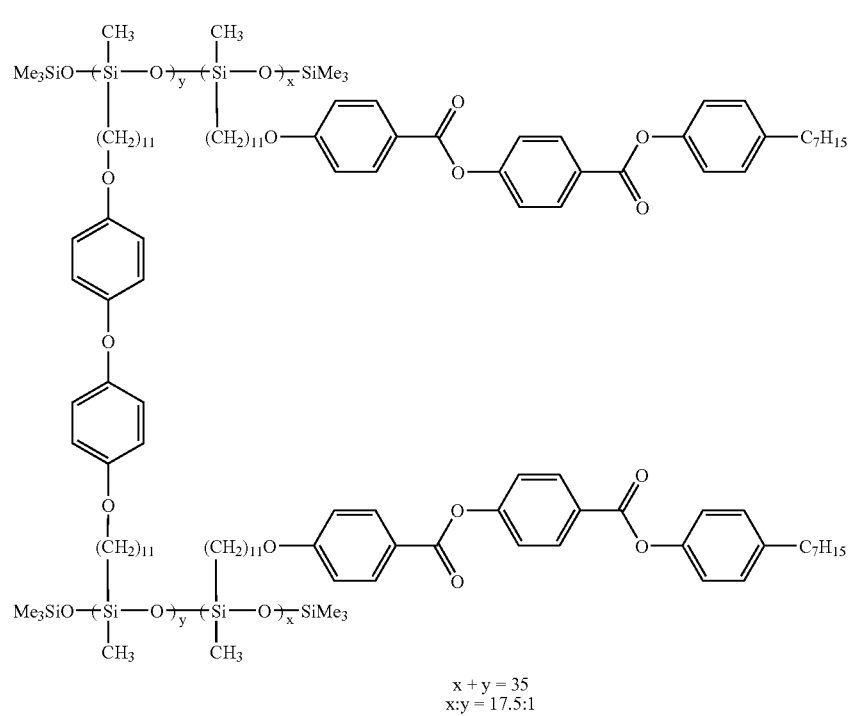
x + y = 35
x:y = 17.5:1

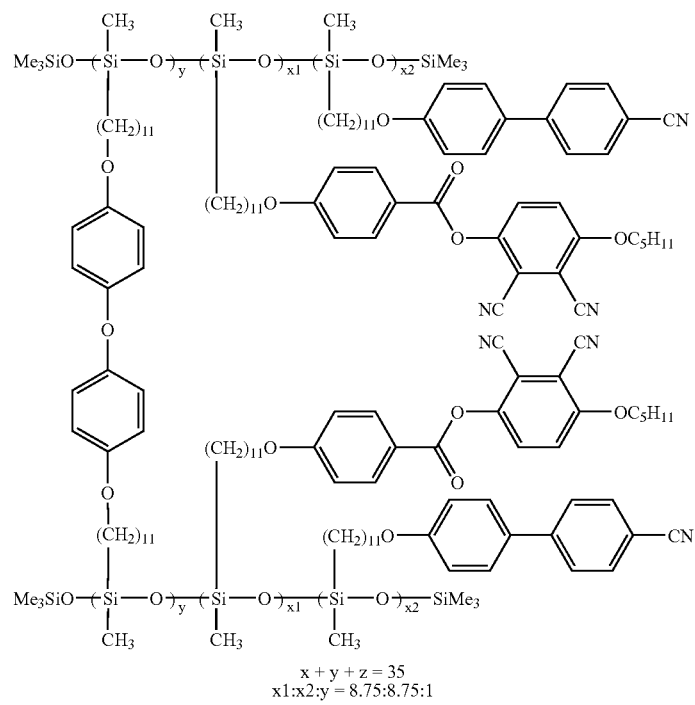
(10)
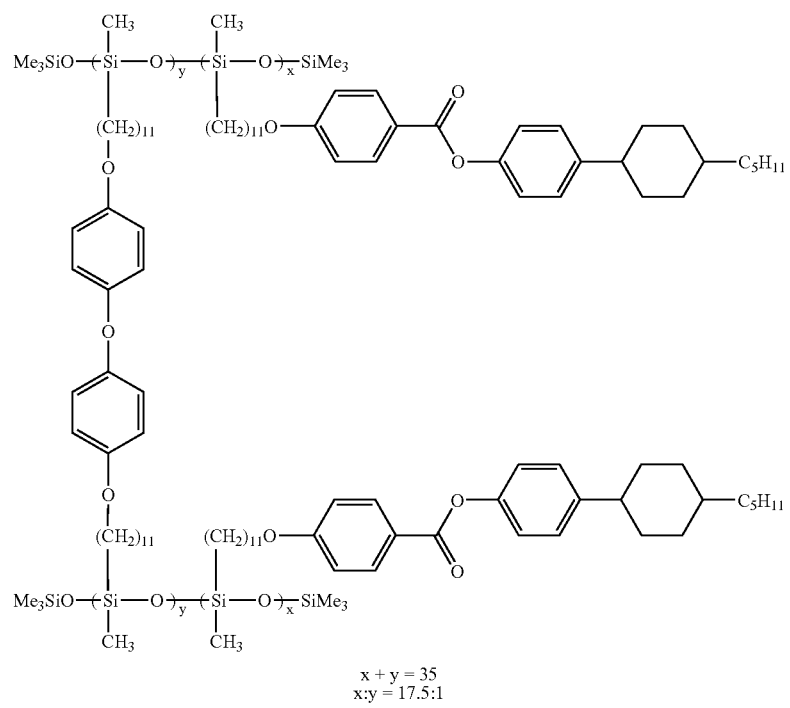
(11)

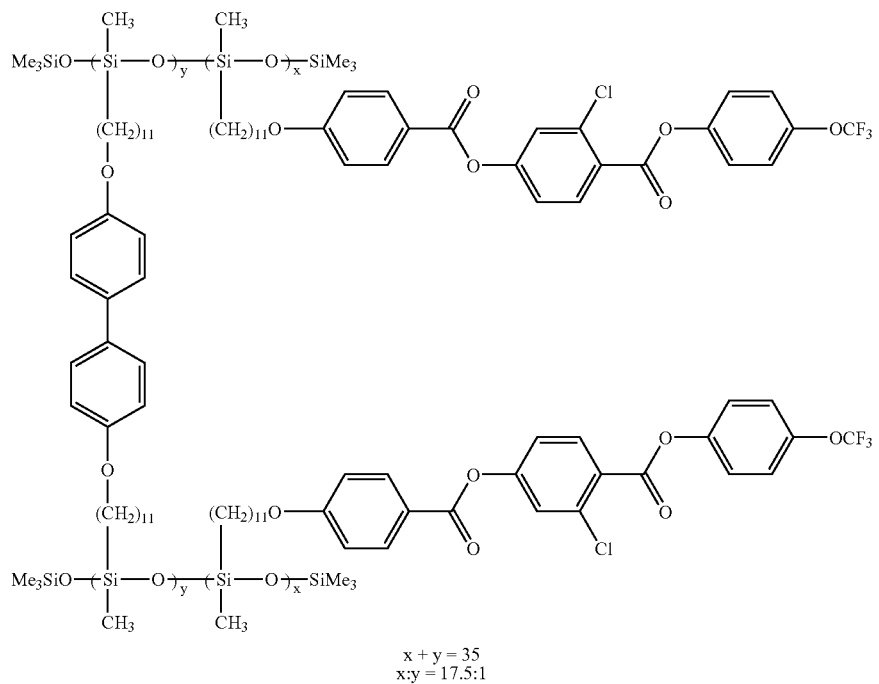
(12)
x + y = 35
x:y = 17.5:1
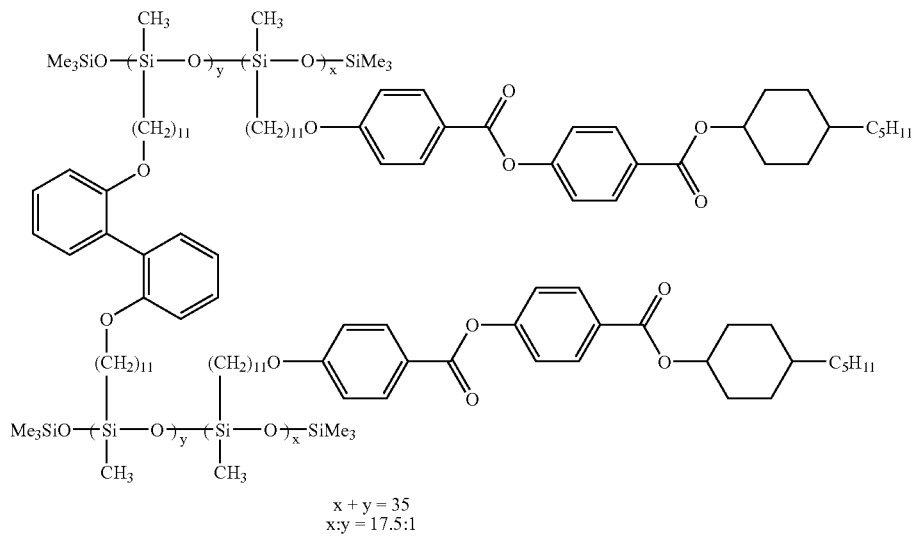
(13)
x + y = 35
x:y = 17.5:1

(14)
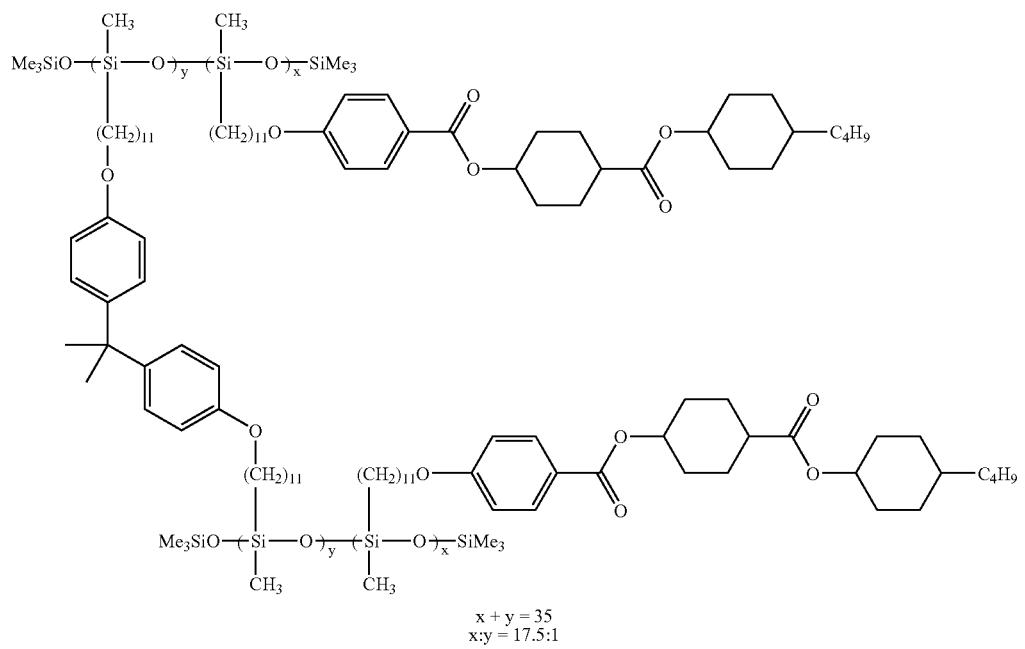
x + y = 35
x:y = 17.5:1
(15)
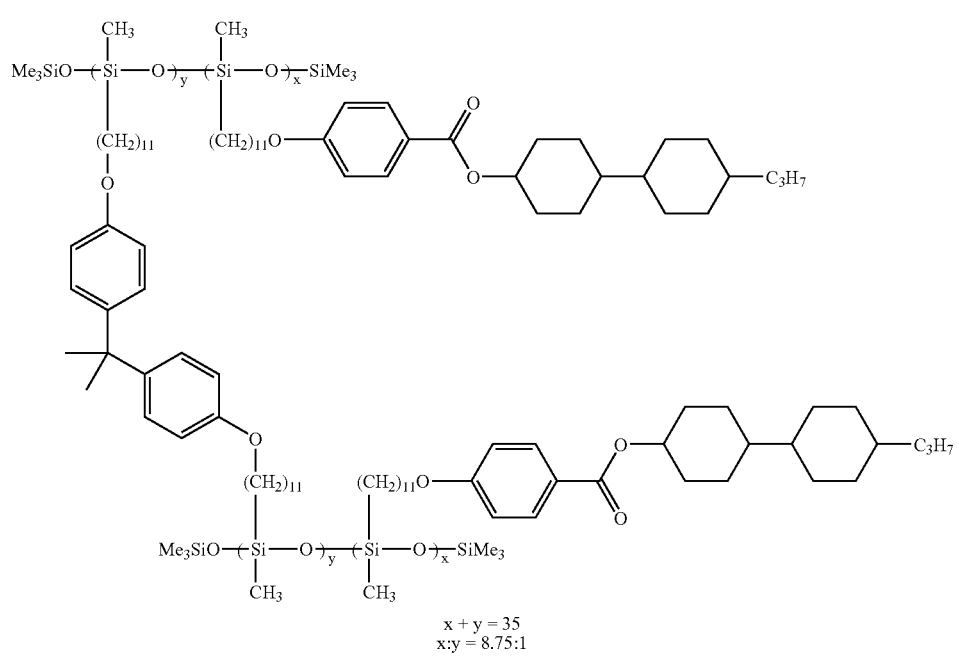
x + y = 35
x:y = 8.75:1

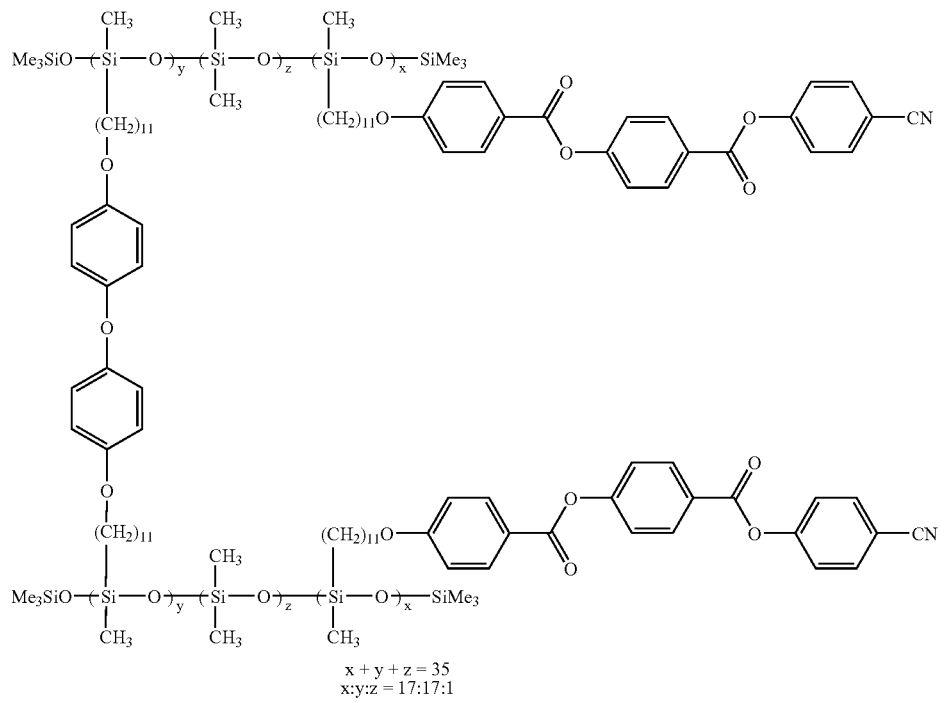
(16)
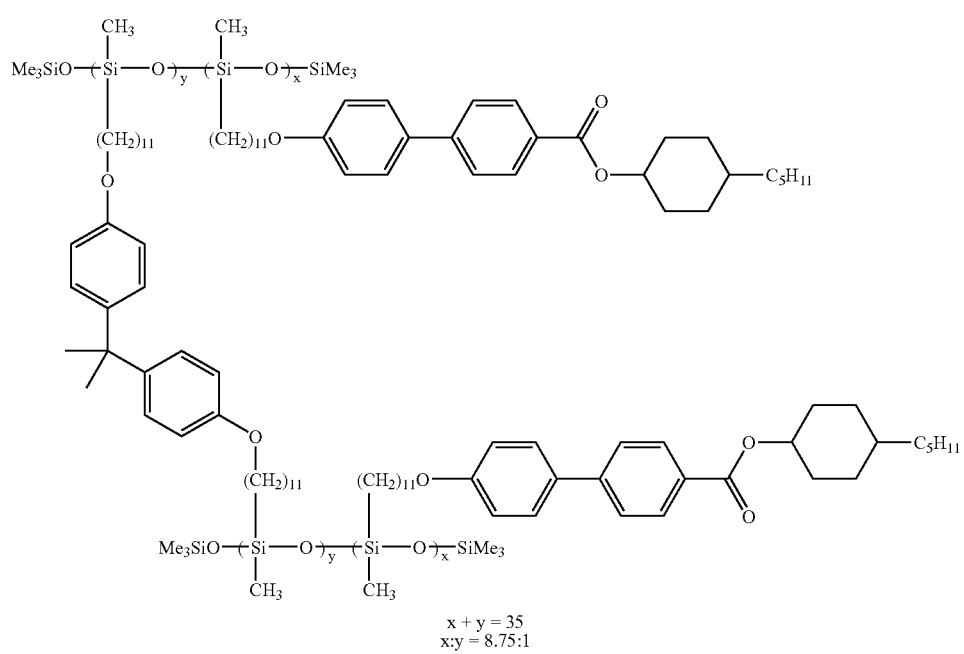
(17)

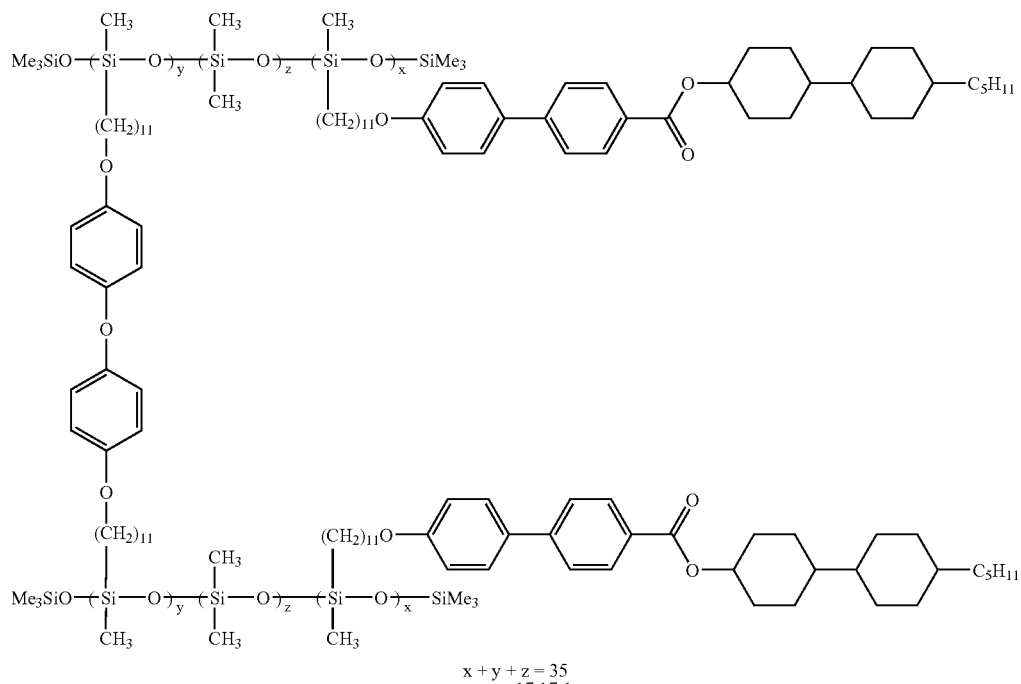
(18)
x + y + z = 35
x:y:z = 17:17:1
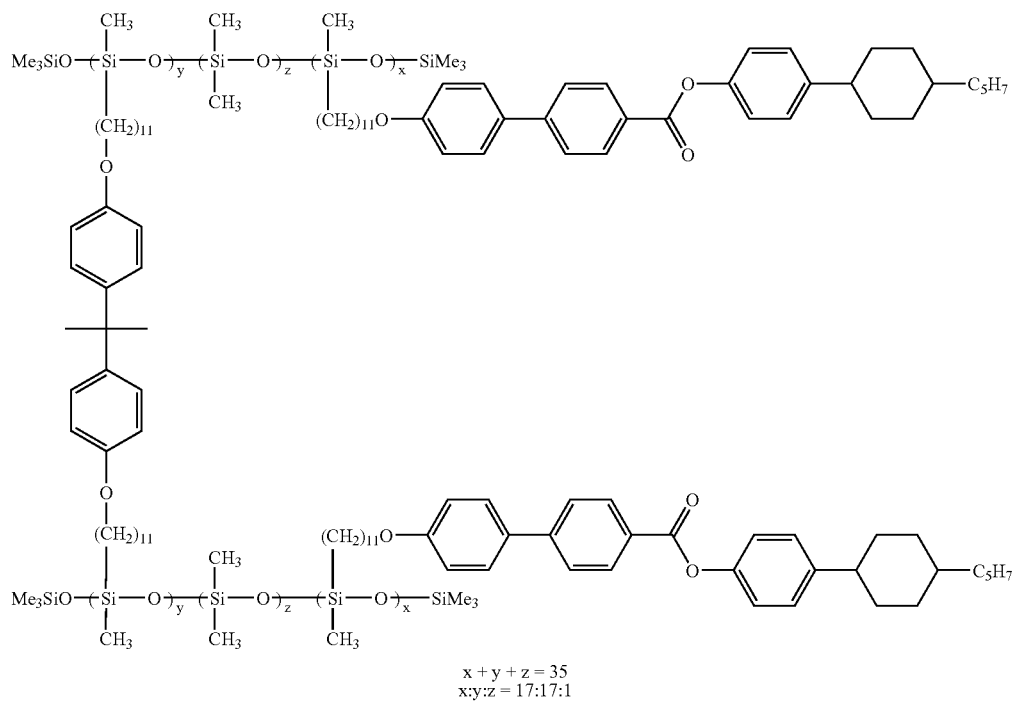
(19)
x + y + z = 35
x:y:z = 17:17:1

(20)
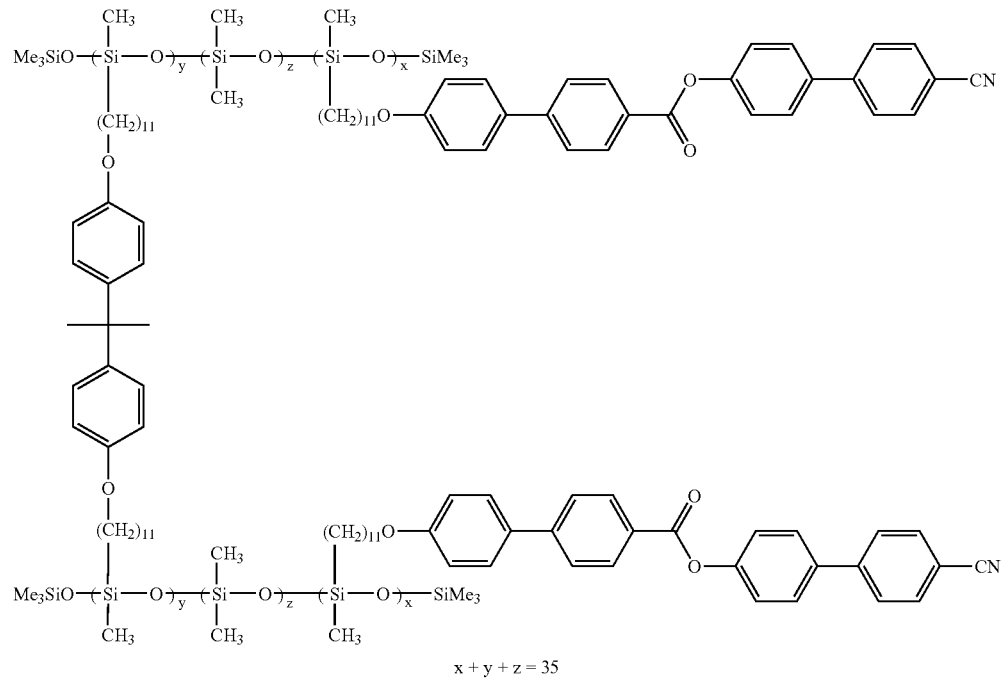
x + y + z = 35
x:y:z = 17:17:1
(21)
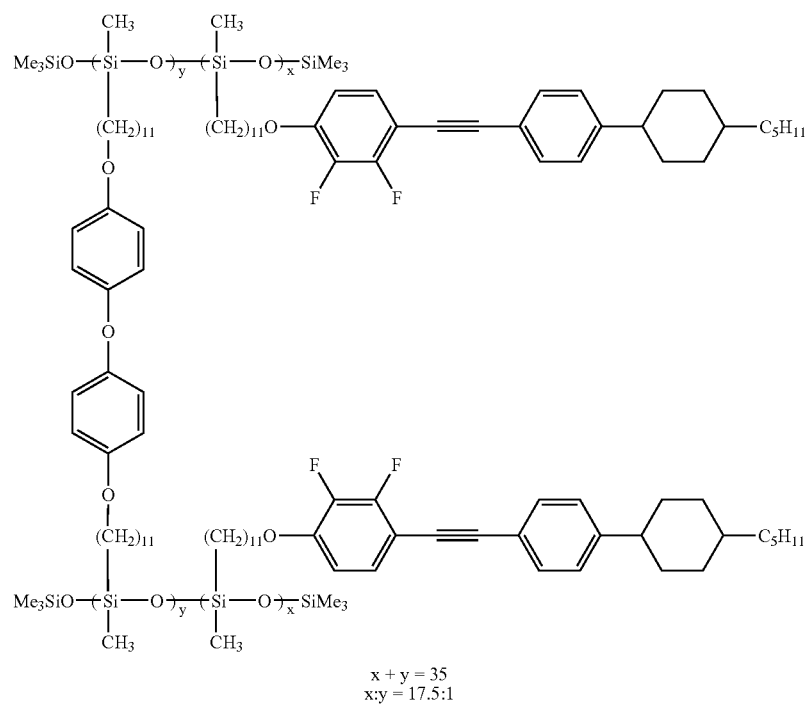
x + y = 35
x:y = 17.5:1

(22)
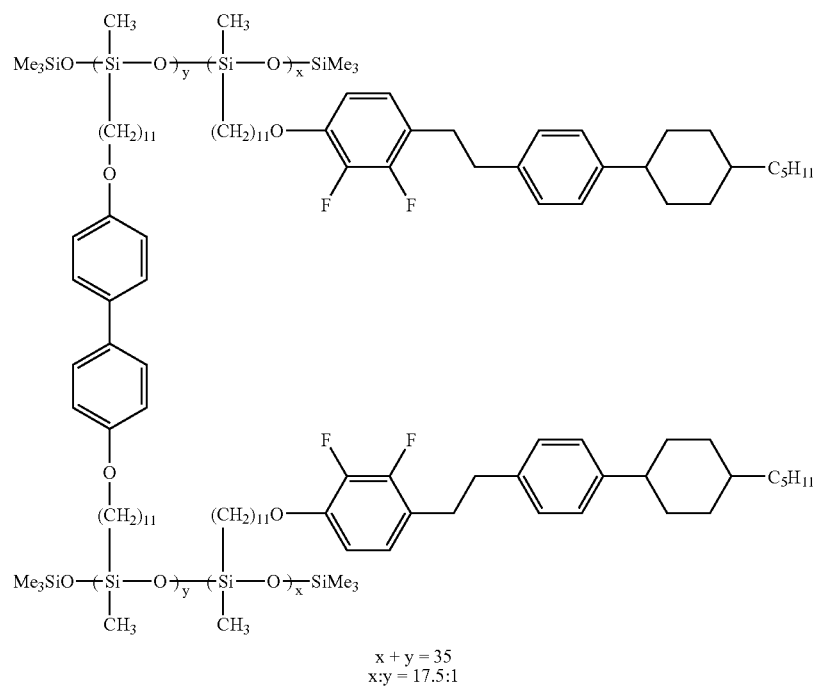
x + y = 35
x:y = 17.5:1
(23)
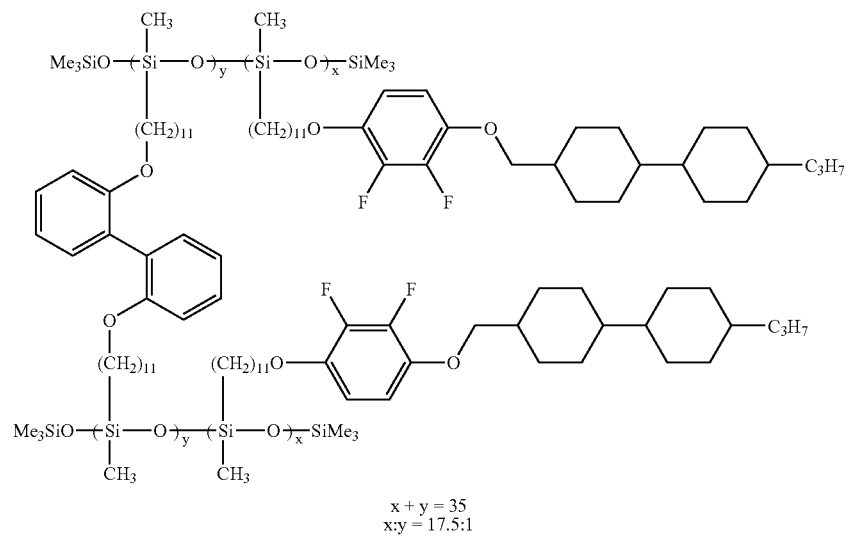
x + y = 35
x:y = 17.5:1

(24)
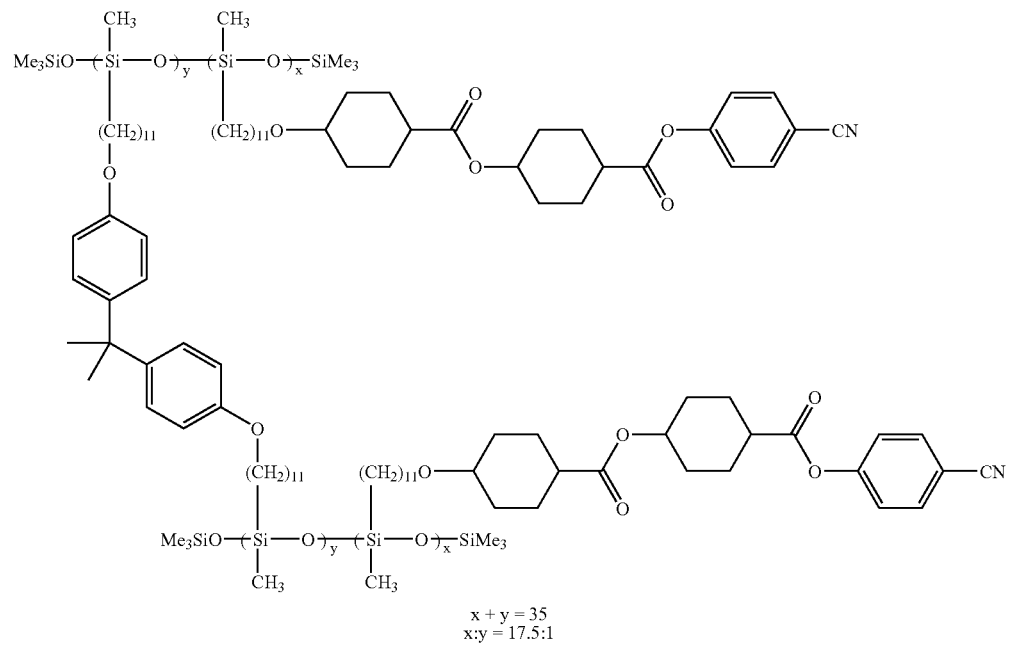
x + y = 35
x:y = 17.5:1
(25)
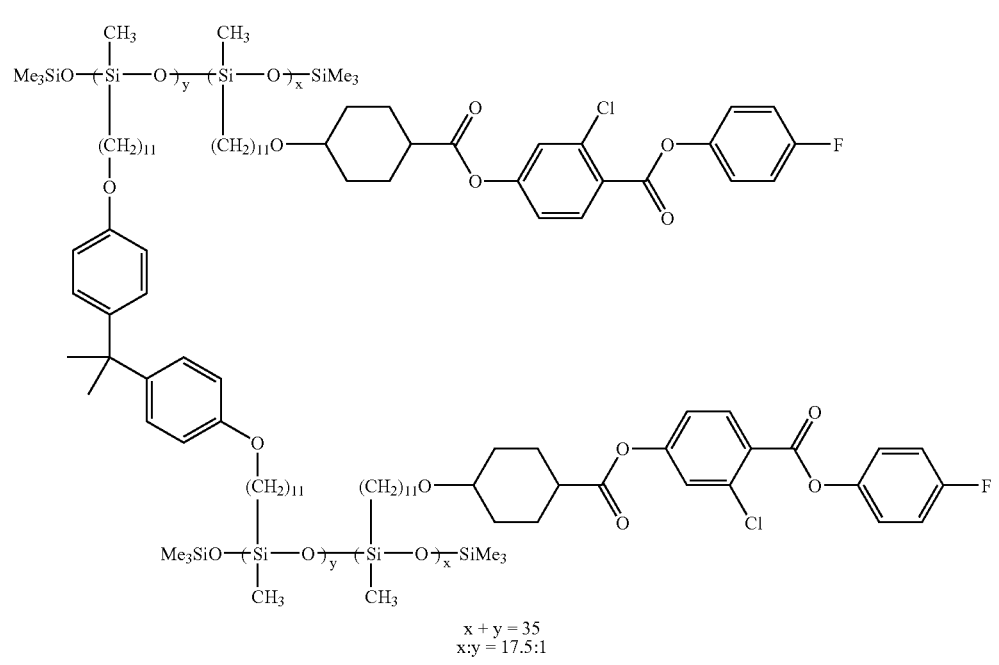
x + y = 35
x:y = 17.5:1

-continued

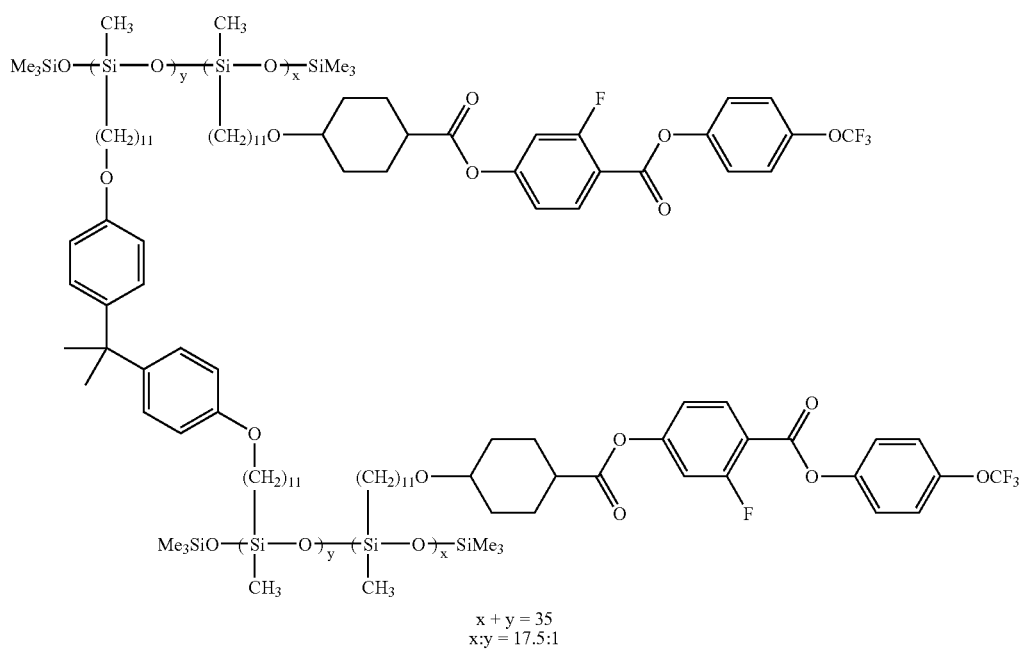

(26)

x + y = 35
x:y = 17.5:1

The cross-linked siloxane polymer is synthesized by hydrosilylation reaction of a polysilane compound having a Si—H group, a side chain liquid crystalline compound having an unsaturated bond at terminals, and a crosslinkable compound having an unsaturated bond at terminals. The side chain liquid crystalline compound and a crosslinkable compound having an unsaturated bond at terminals are synthesized by a common organic synthesis method. The use amount of the side chain liquid crystalline compound having an unsaturated bond at terminals is in a range from 10 mol % to 150 mol %, preferably in a range from 30 mol % to 130 mol %, and more preferably in a range from 50 mol % to 120 mol % to the Si—H group in the polysilane.

The use amount of the crosslinkable compound having an unsaturated bond at terminals is in a range from 0.1 mol % to 100 mol %, preferably in a range from 1 mol % to 50 mol %, and more preferably in a range from 1 mol % to 30 mol % based on the Si—H group in the polysilane.

The ratio of the use amounts of the side chain liquid crystalline compound (A) and crosslinkable compound (B) having an unsaturated bond at terminals (A:B) is in a range from (99 mol %: 1 mole %) to (50 mol % : 50 mol %), preferably in a range from (99 mol %: 1 mole %) to (75 mol % : 25 mol %), and more preferably in a range from (98 mol % : 2 mole %) to (85 mol %: 15 mol %).

A catalyst used for the hydrosilylation is Pt or RH, in specifically, $H_2PtCl_6$, dichlorodicyclopentedienyl platinum ($Cp_2PtCl_2$), $(CH_2=CHSiMe_2OSiMe_2CH=CH_2)_2Pt$ (Karstedt reagent) can be exemplified. The amount of the catalyst is preferably 0.01 mol % to 10 ml %, and preferably 0.1 mol % to 5 mol % based on the side chain liquid crystalline compound having an unsaturated bond at terminals.

A solvent used for the reaction is toluene, xylene, THF, ethyl acetate, and chlorobenzene, and dichlorobenzene, and they may be used alone or in combination. Toluene, xylene, chlorobenzene, and dichlorobenzene are preferable, and toluene and xylene are particularly preferable.

The amount of the solvent is 1 to 10000 times, preferably 10 to 1000 times, and more preferably 50 to 500 times based on the weight of the polysilane.

The reaction temperature is in a range from 50° C. to a boiling point of the solvent, preferably in a range from 50° C. to 100° C., and more preferably in a range from 60° C. to 90° C.

The reaction duration differs depending on the reactivity of the side chain liquid crystalline compound having an unsaturated bond at terminals, however it may be in a range from 1 minute to 1 day, preferably in a range from 10 minutes to 12 hours, and more preferably 1 hour to 6 hours.

The obtained (liquid crystalline) siloxane polymer can be refined by silica gel column chromatography, a recrystallization method, or a re-precipitation method, and these methods may be employed alone or in combination depending on the physical properties of the obtained polymer.

Next, the low molecular weight liquid crystal of the present invention will be described.

The low molecular weight liquid crystal may be those having a molecular weight of 100 to 1,000. The low molecular weight liquid crystal may have any phase, preferably nematic phase and smectic phase.

Practical examples of the liquid crystalline compounds may be described in "Molecular Structure and Liquid Crystallinity", Chapter 3, Liquid Crystal Handbook, edited by Liquid Crystal Handbook Editing Society (2000) printed by MARUZEN CO., LTD. Further preferable compounds as the liquid crystalline compounds are compounds that have the alignment state changeable by the electric field and have a function of controlling the alignment state of a dichroic dye which is dissolved as a guest.

Examples are azomethine compounds, cyanobiphenyl compounds, cyanophenyl esters, fluorine-substituted phenyl esters, cyclohexanecarboxylic acid phenyl esters, fluorine-substituted cyclohexanecarboxylic acid phenyl ester, cyanophenylcyclohexane, fluoro-substituted phenylcyclohexane, cyano-substituted phenylpyrimidine, fluorine-substituted phenylpyrimidine, alkoxy-substituted phenylpyrimidine, fluorine- and alkoxy-substituted phenylpyrimidine, phenyldioxane, tolan type compounds, fluorine-substituted tolan type compounds, and alkenylcyclohexylbenzonitrile. Also, liquid crystalline compounds described in Liquid Crystal Device Handbook, pp. 154-192 and pp. 715-722, edited by No. 142 Committee of Japan Society for the Promotion of Science, published by Nikkan Kogyo Shimbum (1989) are usable. The host liquid crystals substituted by fluorines are usable, and those host liquid crystals are suitable for TFT driving. Further, liquid crystals manufactured by Merck (e.g., ZLI-4692, MLC-6267, 6284, 6287, 6288, 6406, 6422, 6423, 6425, 6435, 6437, 7700, 7800, 9000, 9100, 9200, 9300, and 10000) and liquid crystals manufactured by Chisso Corp. (e.g., LIXON 5036xx, 5037xx, 5039xx, 5040xx, and 5041xx) can be used.

The low molecular weight liquid crystal of the present invention is more preferably a two-frequency driving liquid crystal compound. Herein, the two-frequency driving liquid crystal is a liquid crystal which exhibits positive dielectric constant anisotropy when the frequency of the electric field is applied to the liquid crystal under a low frequency region and exhibits revered negative dielectric constant anisotropy when the frequency of the electric field is applied to the liquid crystal under a high frequency region. Such a liquid crystal is described in detail in Liquid Crystal Device Handbook, pp. 189-192, edited by No. 142 Committee of Japan Society for the Promotion of Science, published by Nikkan Kogyo Shimbum (1989).

As practical examples of the two-frequency driving liquid crystal are exemplified two-frequency driving liquid crystals manufactured by Eastman Kodak Co. as follows.

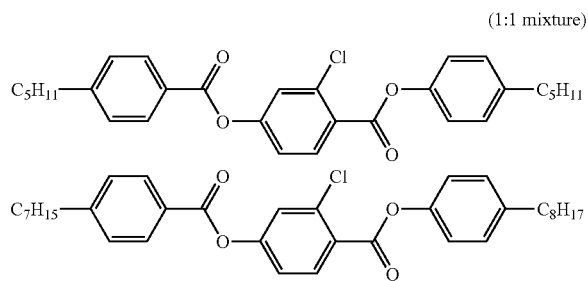

(1:1 mixture)

Additionally, as commercialized two-frequency driving liquid crystal materials are exemplified DF-02XX, DF-05XX, FX-1001, and FX-1002 manufactured by Chisso Corp. and MLC-2048 manufactured by Merck. The two-frequency driving liquid crystal compounds used in the present invention may be mixtures of a plurality of liquid crystalline compounds.

The present invention provides a guest-host type liquid crystal composition using a dichroic dye, and as a host liquid crystal, mixtures of the above-mentioned (liquid crystalline) siloxane polymers and low molecular weight liquid crystals can be employed. In order to change the physical properties of such a host liquid crystal (e.g. temperature range for liquid crystal phase, dielectric constant anisotropy, refractive index anisotropy, and crossover frequency), a compound, which does not exhibit liquid crystallinity, may be added. Herein, the crossover frequency means the frequency at which the dielectric constant anisotropy of the two-frequency driving liquid crystal is changed from positive to negative.

The liquid crystal composition of the present invention may contain an ultraviolet ray absorbent and an antioxidant.

The liquid crystal composition of the present invention may further contain a kiral compound. Herein, the kiral agent may be an optically active substance, and the liquid crystal composition exhibits kiral nematic phase when the kiral agent is added. Examples of the kiral agent are described as kiral agents for TN and STN which are written in Liquid Crystal Device Handbook, pp. 199-202, edited by No. 142 Committee of Japan Society for the Promotion of Science, published by Nikkan Kogyo Shimbum (1989).

Although the ratio of the low molecular weight liquid crystal based on the cross-linked polymer (preferably the cross-linked siloxane polymer) in the liquid crystal composition of the present invention may be not limited, but it is preferably (low molecular weight liquid crystal): (cross-linked polymer)=(50 wt %: 50 wt %) to (99 wt %: 1 wt %), preferably (60 wt % : 40 wt %) to (98 wt %: 2 wt %), and more preferably (75 wt %: 25 wt %) to (98 wt %: 2 wt %).

Next, the dichroic dye of the present invention will be described.

The dichroic dye is defined as a compound which is dissolved in a host liquid crystal to exhibit a function of absorbing light. The maximum light-absorbing wavelength and light-absorbing band of the dichroic dye of the present invention is not specifically limited, but it is preferred to have an absorption maximum in the yellow region (Y), magenta region (M), or cyan region (C). The dichroic dye used in the liquid crystal element of the present invention may be used either alone or in combination of a plurality of the dyes. When plural dyes are mixed, the dyes of the present invention may be mixed, or a dyes of the present invention and other known dichroic dye may be mixed, and it is preferred to use a mixture of the dichroic dyes having absorption maximums in Y, M, and C regions, respectively. Known dichroic dyes include those described in "Dichroic Dyes for Liquid Crystal Display" by A. V. Ivashchenko (CRC, 1994). Methods of displaying a full color by mixing a yellow dye, a magenta dye and a cyan dye is specifically described in "Color Chemistry" (by Sumio Tokita, Maruzen Company, Limited, 1982). The yellow region is the range of 430 to 490 nm, the magenta region is the range of 500 to 580 nm, and the cyan region is the range of 600 to 700 nm.

Next, a chromophore used for the dichroic dye of the present invention will be described.

The chromophore used in the dichroic dye is not particularly limited, but it is preferred to use azo dyes, anthraquinone dyes, perylene dyes, merocyanine dyes, azomethine dyes, phthaloperylene dyes, indigo dyes, azulene dyes, dioxazine dyes, polythiophene dyes, and phenoxazine dyes. Preferable examples are azo dyes, anthraquinone dyes, phenoxazine dyes, and more preferable examples are anthraquinone dyes and phenoxazone dyes (e.g. phenoxazin-3-one)

The azo dyes may be any such as monoazo dyes, bisazo dyes, trisazo dyes, tetrakisazo dyes, and pentakisazo dyes, and preferably monoazo dyes, bisazo dyes, and trisazo dyes.

Cyclic structures contained in the azo dyes are aromatic groups (e.g. a benzene ring and a naphthalene ring); heterorings (e.g. a quinoline ring, a pyridine ring, a thiazole ring, a benzothiazole ring, an oxazole ring, a benzoxazole ring, an imidazole ring, a benzoimidazole ring, and a pyrimidine ring.

A substituent of the anthraquinone dyes is preferably those containing an oxygen atom, a sulfur atom or a nitrogen atom, and examples are an alkoxy group, an aryloxy group, an alkyltio group, an arylthio group, an alkylamino group, and an arylamino group. The number of the substituents for substitution may be optional and di-substituted, tri-substituted, and tetrakis-substituted groups are preferable, and di-substituted and tri-substituted groups are more preferable. The substituting point of the substituent may be optional, and preferably 1,4-di-substituted, 1,5-di-substituted, 1,4,5-tri-substituted, 1,2,4-trisubstituted, 1,2,5-trisubstituted, 1,2,4,5,-tetra-substituted, and 1,2,5,6-tetra substituted structure.

A substituent of the phenoxazone (phenoxazin-3-one) dyes is preferably those containing an oxygen atom, a sulfur atom or a nitrogen atom, and examples are an alkoxy group, an aryloxy group, an alkyltio group, an arylthio group, an alkylamino group, and an arylamino group.

More specifically, the dichroic dye of the present invention has preferably the substituent represented by the following Formula (2):

$-(\text{Hat})_j-\{(B^1)_p-(Q^1)_q-(B^2)_r\}_n-C^1$     Formula (2):

wherein the Het is an oxygen atom or a sulfur atom, and particularly preferably a sulfur atom.

In the Formula (2), $B^1$ and $B^2$ each represent an arylene group, a heteroarylene group, or a divalent cyclic aliphatic hydrocarbon group, which may have a substituent.

The arylene group represented by $B^1$ and $B^2$ is preferably an arylene group having 6 to 20 carbon atoms, or more preferably 6 to 10 carbon atoms. Preferred examples of the arylene group include a phenylene group, a naphthalene group, and an anthracene group. Substituted phenylene group is particularly preferred, and 1,4-phenyl group is further preferred.

The heteroarylene group represented by $B^1$ and $B^2$ is preferably a heteroarylene group having 1 to 20 carbon atoms, more preferably 2 to 9 carbon atoms. Specific examples of the heteroarylene group include groups having a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, a triazole ring, and a heteroarylene group which is obtained by subtracting one hydrogen atom from each of hydrogen atoms bonded to two carbon atoms of a condensed ring formed by condensing the above rings.

The divalent cyclic aliphatic hydrocarbon group represented by $B^1$ and $B^2$ is preferably a divalent cyclic aliphatic hydrocarbon group having 3 to 20 carbon atoms, more preferably 4 to 10 carbon atoms. Specific examples of preferred divalent cyclic aliphatic hydrocarbon groups include a cyclohexadiyl and cyclopentadiyl, more preferably cyclohexane-1,2-diyl group, cyclohexane-1,3-diyl group, cyclohexane-1,4 diyl group, and cyclopentane-1,3-diyl, and most preferably (E)-cyclohexane-1,4-diyl.

The divalent arylene group, divalent heteroarylene group, and divalent cyclic hydrocarbon group represented by $B^1$ and $B^2$ may further have a substituent. The substituents include the substituent group V as described in the above.

Preferred examples of the substituent group V include an alkyl group, an aryl group, an alkoxy group, an aryl oxy group, a halogen atom, a amino group, a substituted amino group, a hydroxyl group, an alkylthio group, an arylthio group, and a sulfo group, and more preferably, are an alkyl group, an aryl group, a halogen atom, and a sulfo group.

$Q^1$ is a divalent linking group, and is preferably a linking group having an atomic group containing at least one atom selected from the group consisting of a carbon atom, nitrogen atom, sulfur atom, and oxygen atom.

The divalent linking group represented by $Q^1$ is preferably a divalent linking group having 0 to 60 carbon atoms, more preferably 0 to 30 carbon atoms, further preferably 0 to 20 carbon atoms.

The divalent linking group represented by $Q^1$ is preferably an alkylene group, an alkenylene group, an alkenylene group, an amido group, an ether group, an ester group, a sulfoamide group, sulfonic acid ester group, ureido group, sulfonyl group, sulfinyl group, thioether group, carbonyl group, —NR— group (R represents a hydrogen atom, an alkyl group, or an aryl group), azo group, azoxy group, and divalent linking group combining one or more heterocyclic ring divalent groups.

The alkylene group represented by $Q^1$ is preferably an alkylene group having 1 to 20 carbon atoms, more preferably 1 to 10 carbon atoms, and includes, for example, a methylene group, an ethylene group, a propylene group, a butylene group, a pentylene group, and a cyclohexyl-1,4-diyl group.

The alkenylene group represented by $Q^1$ is preferably an alkenylene group having 2 to 20 carbon atoms, more preferably 2 to 10 carbon atoms, and includes, for example, an ethynylene group.

The alkynilene group represented by $Q^1$ is preferably alkynilene group having 2 to 20 carbon atoms, more preferably 2 to 10 carbon atoms, and includes, for example, an ethynylene group.

The alkyl group represented by R in —NR— is preferably an alkyl group having 1 to 20 carbon atoms, more preferably 1 to 10 carbon atoms, and an aryl group represented by R in —NR— is preferably an aryl group having 6 to 14 carbon atoms, more preferably 6 to 10 carbon atoms.

The heterocyclic ring represented by $Q^1$ is preferably a heterocyclic ring having 2 to 20 carbon atoms, or more preferably 4 to 10 carbon atoms, and includes, for example, a piperazine group, such as piperazine-1,4-diyl group.

The divalent linking group represented by $Q^1$ is preferably an alkylene group, an alkenylene group, an alkinylene group, an ether group, a thioether group, an amido group, an ester group, a carbonyl group, and their combinations.

The divalent linking group represented by $Q^1$ is particularly preferably an alkylene group, an alkinylene group, an ether group, an amido group, an ester group, and a carbonyl group.

$C^1$ represents an alkyl group, a cycloalkyl group, an alkoxy group, an alkoxy carbonyl group, a acyl group, or an acyloxy group.

$C^1$ is preferably an alkyl group or a cycloalkyl group having 1 to 30 carbon atoms, more preferably 1 to 12 carbon atoms, or most preferably 1 to 8 carbon atoms, an alkoxy group having 1 to 20 carbon atoms, more preferably 1 to 10 carbon atoms, or most preferably 1 to 8 carbon atoms, an acyloxy group having 1 to 20 carbon atoms, more preferably 2 to 12 carbon atoms, or most preferably 2 to 8 carbon atoms, an acyl group having 1 to 30 carbon atoms, more preferably 1 to 12 carbon atoms, or most preferably 1 to 8 carbon atoms, or an alkoxy carbonyl group having 2 to 20 carbon atoms, more preferably 2 to 12 carbon atoms, or most preferably 2 to 8 carbon atoms.

The alkyl group, cycloalkyl group, alkoxy group, alkoxy carbonyl group, acyl group, or acyloxy group may have a substituent, and the substituent may be selected from the substituent group V as described above.

Substituent for the alkyl group represented by $C^1$ is preferably a halogen atom, a cyano group, a hydroxy group, a carbamoyl, an alkoxy group, an aryloxy group, an acyl, an acyloxy group, an acylamino group, an amino group, an alkylthio group, an arylthio group, a heteroarylthio group, an alkoxycarbonyl group, and aryloxycarbonyl among the the substituent group V.

Substituent for the cycloalkyl group represented by $C^1$ is preferably a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl among the the substituent group V.

Substituent for the alkoxy group represented by $C^1$ is preferably a halogen atom (especially a fluoro atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group among the the substituent group V.

Substituent for the alkoxycarbonyl group represented by $C^1$ is preferably a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group among the the substituent group V.

Substituent for the acyl group represented by $C^1$ is a halogen atom, a cyano group, a hydroxy group, a carbamoyl, an alkoxy group, an aryloxy group, an acyl group, an acyloxy group, an acylamino group, an alkylthio group, an arylthio group, a heteroarylthio group, an alkoxycarbonyl group, and an aryloxycarbonyl group among the the substituent group V. Substituent for the acyloxy group represented by $C^1$ is a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group among the the substituent group V.

Specific examples of the alkyl and cycloalkyl group represented by $C^1$ include methyl, ethyl, propyl, butyl, tert-butyl, iso-butyl, sec-butyl, pentyl, tert-pentyl, hexyl, heptyl, octyl, cyclohexyl, 4-methycyclohexyl, 4-ethylcyclohexyl, 4-propylcyclohexyl, 4-butylcyclohexyl, 4-pentylcyclohexyl, hydroxymethyl, trifluoromethyl, and benzyl.

Specific examples of the alkoxy group represented by $C^1$ include methoxy, ethoxy, 2-methoxyethoxy, 2-phenylethoxy, and trifluoromethoxy.

Specific examples of the acyloxy group represented by $C^1$ include acetyloxy and benzoyloxy.

Specific examples of the acyl group represented by $C^1$ include acetyl, formyl, pivaloyl, 2-chloroacetyl, stearoyl, benzoyl, and p-n-octyloxyphenylcarbonyl.

Specific examples of the alkoxycarbonyl group represented by $C^1$ include methoxycarbonyl, ethoxycarbonyl, and 2-benzyloxycarbonyl.

$C^1$ is preferably an alkyl or an alkoxy, and more preferably an ethyl group, a propyl group, a butyl group, a pentyl group, a hexyl group, or a trifluoromethoxy group.

"j" represents 0 or 1, and preferably 0.

"p", "q", and "r" each independently represent an integer of 0 to 5, and "n" represents an integer of 1 to 3. The total number of the groups represented by $B^1$ and $B^2$, that is, (p+r)×n, is an integer of 3 to 10, and more preferably an integer of 3 to 5. When p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $\{(B^1)_p\text{-}(Q^1)_q\text{-}(B^2)_r\}$ may be the same or different.

The preferable combinations of p, q, r, and n are as follows:
(i) p=3, q=0, r=0, n=1;
(ii) p=4, q=0, r=0, n=1;
(iii) p=5, q=0, r=0, n=1;
(iv) p=2, q=0, r=1, n=1;

(v) p=2, q=1, r=1, n=1;
(vi) p=1, q=1, r=2, n=1;
(vii) p=3, q=1, r=1, n=1;
(viii) p=2, q=0, r=2, n=1;
(ix) p=1, q=1, r=1, n=2;
(x) p=2, q=1, r=1, n=2;

Particularly preferable combinations are (i) p=3, q=0, r=0, n=1; (iv) p=2, q=0, r=1, n=1; and (v) p=2, q=1, r=1, and n=1.

Further, $-\{(B^1)_p\text{-}(Q^1)_q\text{-}(B^2)_r\}_n\text{---}C^1$ preferably contains a partial structure having a liquid crystallinity. The phase of the liquid crystal is not specifcally limited, but preferably includes a nematic liquid crystal, a smectic liquid crystal, and a discotic liquid crystal, and the nematic liquid crystal is particularly preferable.

Specific example of $-\{(B^1)_p\text{-}(Q^1)_q\text{-}(B^2)_r\}_n\text{---}C^1$ will be described below, but the present invention is not limited to these examples (in this formula, the wavy lines indicate the linking positions).

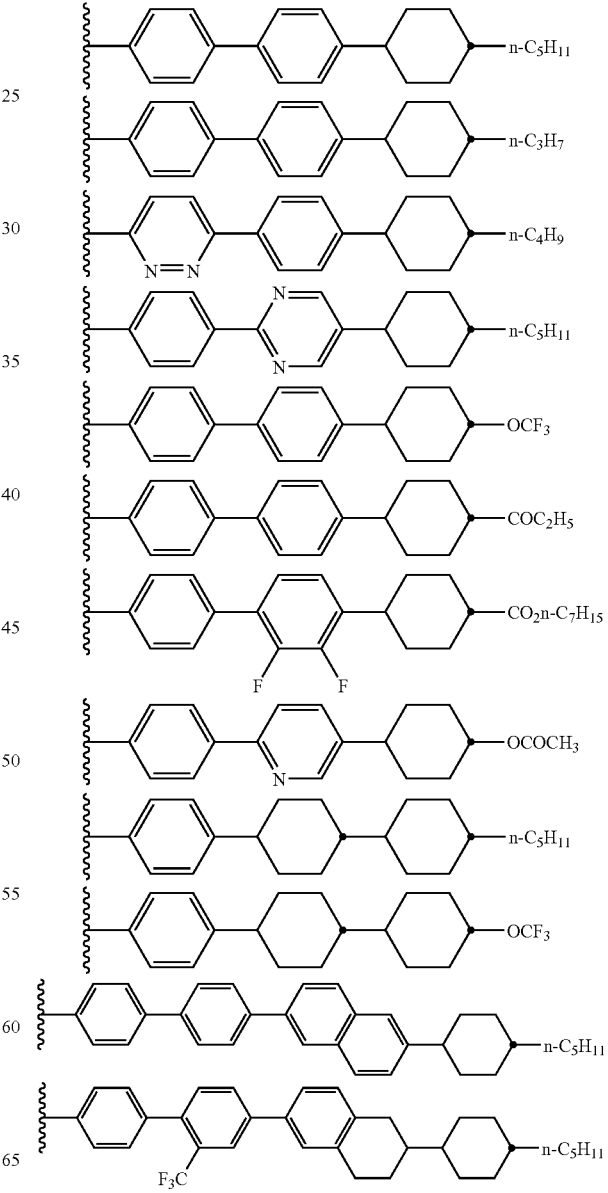

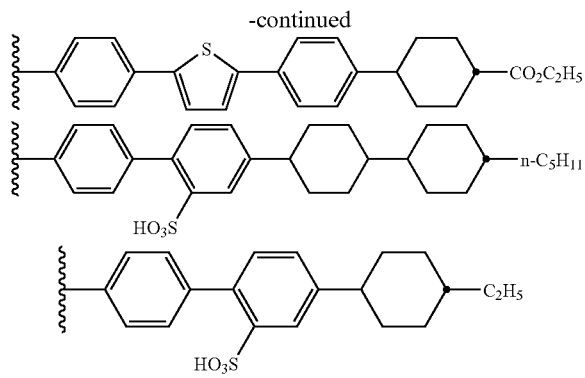

The dichroic dye used in the present invention has preferably one or more substituents represented by the formula —{(B$^1$)$_p$-(Q$^1$)$_q$-(B$^2$)$_r$}$_n$—C$^1$, and more preferably 1 to 8 groups, furthermore preferably 1 to 4 groups and even more preferably 1 to 2 groups.

A preferred structure of substituents represented by the Formula (2) is the following combination.

[1] A structure in which Het is a sulfur atom, B$^1$ represents an aryl group or a heteroaryl group, B$^2$ represents a cyclohexane-1,4-diyl group, C$^1$ represents an alkyl group, and j=1, p=2, q=0, r=1, and n=1.

[2] A structure in which Het is a sulfur atom, B$^1$ represents an aryl group or a heteroaryl group, B$^2$ represents a cyclohexane-1,4-diyl group, C$^1$ represents an alkyl group, and j=1, p=1, q=0, r=2, and n=1.

Particularly preferred structures are as follows:

[I] A structure in which Het represents a sulfur atom, B$^1$ represents a 1,4-phenylene group, B$^2$ represents a trans-cyclohexyl group, C$^1$ represents an alkyl group (preferably methyl group, ethyl group, propyl group, butyl group, pentyl group or hexyl group), and j=1, p=2, q=0, r=1, and n=1, as represented by the Formula (a-1) below.

[II] A structure in which Het represents a sulfur atom, B$^1$ represents a 1,4-phenylene group, B$^2$ represents a trans-cyclohexane-1,4-diyl group, C$^1$ represents an alkyl group (preferably methyl group, ethyl group, propyl group, butyl group, pentyl group or hexyl group), and j=1, p=1, q=0, r=2, and n=1, as represented by the Formula (a-2) below;

Formula (a-1)

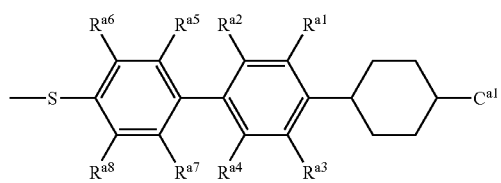

Formula (a-2)

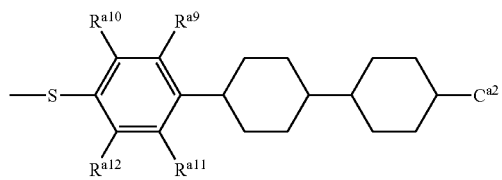

In the Formulas (a-1) and (a-2), R$^{a1}$ to R$^{a12}$ each independently represent a hydrogen atom or a substituent. The substituent includes substituents selected from the substituent group V as described above.

R$^{a1}$ to R$^{a12}$ each independently represent a hydrogen atom, a halogen atom (in particular, fluorine atom), an alkyl group, an aryl group, and an alkoxy group. Of the alkyl group, aryl group, and alkoxy group represented by R$^{a1}$ to R$^{a12}$, preferred alkyl group, aryl group, and alkoxy group are the same described in the substituent group V in the above.

In Formulae (a-1) and (a-2), C$^{a1}$ and C$^{a2}$ each independently represent an alkyl group, preferably an alkyl group having 1 to 20 carbon atoms, more preferably 1 to 10 carbon atoms. Particularly preferred examples are a methyl group, ethyl group, propyl group, butyl group, pentyl group, and hexyl group.

Azo dye includes monoazo dye, bisazo dye, trisazo dye, tetraxisazo dye, pentaxisazo dye, and others, and monoazo dye, bisazo dye, and trisazo dye are preferred.

Cyclic structures contained in the azo dye include aromatic rings (benzene ring, naphthalene ring and the like), and other hetero rings (quinoline ring, pyridine ring, thiazole ring, benzothiazole ring, oxazole ring, benzoxazole ring, imidazole ring, benzimidazole ring, pyrimidine ring and the like).

Substituent for the anthraquinone dye preferably contains an oxygen atom, a sulfur atom or a nitrogen atom, such as an alkoxy group, an aryloxy group, an alkylthio group, an arylthio group, an alkyl amino group, and an aryl amino group.

The number of substituents is not specifically limited, but is preferably di-substitution, tri- substitution or tetraxis-substitution, and di-substitution and tri-substitution are particularly preferred. The position of the substituent is not particularly limited, but preferred examples are di-substitution at 1,4 positions, di-substitution at 1,5 positions, tri-substitution at 1,4,5 positions, tri-substitution at 1,2,4-positions, tri-substitution at 1,2,5-position, tetra-substitution at 1,2,4,5 positions, and tetra-substitution at 1,2,5,6 position.

The anthraquinone type dyes are more preferably compounds represented by the following Formula (3).

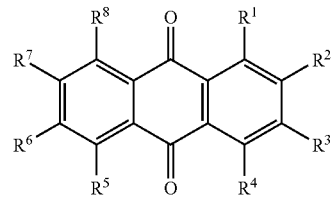

Formula (3)

In the Formula (3), at least one of R$^1$, R$^2$, R$^3$, R$^4$, R$^5$, R$^6$, R$^7$, and R$^8$ is -(Het)$_j$-{(B$^1$)$_p$-(Q$^1$)$_q$-(B$^2$)$_r$}$_n$—C$^1$ and the remaining groups each independently represent a hydrogen atom or a substituent.

In -(Het)$_j$-{(B$^1$)$_p$-(Q$^1$)$_q$-(B$^2$)$_r$}$_n$—C$^1$, Het represents an oxygen atom or a sulfur atom; B$^1$ and B$^2$ each independently represent an arylene group, a heteroarylene group, or a divalent alicyclic hydrocarbon group; Q$^1$ represents a divalent linking group; C$^1$ represents an alkyl group, a cycloalkyl group, an alkoxy group, an alkoxycarbonyl group, an acyl group, or an acyloxy group; j represents 0 or 1; p, q, and r represent an integer of 0 to 5; n represents an integer of 1 to 3; and (p+r)×n is an integer of 3 to 10, and preferably an integer of 3 to 5. When p is 2 or larger, two or more groups represented by B$^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $\{(B^1)_p\text{-}(Q^1)_q\text{-}(B^2)_r\}$ may be the same or different.

Herein, the preferable ranges of Het, $B^1$, $B^2$, $Q^1$, $C^1$, j, p, q, r, and n have the same meaning as the above-mentioned ranges preferable of Het, $B^1$, $B^2$, $Q^1$, $C^1$, j, p, q, r, and n of the above-mentioned Formula (2).

The substituents in the Formula (3) are the substituent group V, and preferably a halogen atom, a mercapto group, a hydroxy group, a carbamoyl, group a sulfamoyl group, a nitro group, an alkoxy group, an aryloxy group, an acyloxy group, an acylamino group, an amino group, an alkylthio group, an arylthio group, a heteroarylthio group, an alkoxycarbonyl group, an aryloxycarbonyl group, an alkyl group, an aryl group, and a heteroaryl group, and more preferably a halogen atom, a hydroxy group, a nitro group, an alkoxy group, an aryloxy group, an acyloxy group, an amino group, an alkylthio group, an arylthio group, a heteroarylthio group, an alkoxycarbonyl group, an aryloxycarbonyl group, an alkyl group, an aryl group, and a heteroaryl group.

Further, in the Formula (3), it is more preferable that at least one of $R^1$, $R^4$, $R^5$, and $R^8$ represents -(Het)$_j$-$\{(B^1)_p\text{-}(Q^1)_q\text{-}(B^2)_r\}_n$—$C^1$.

A substituent of phenoxazone dyes (phenoxazin-3-one) preferably contains an oxygen atom, a sulfur atom, or a nitrogen atom and preferable examples may include an alkoxy group, an aryloxy group, an alkylthio group, an arylthio group, an alkylamino group, and an arylamino group.

The phenoxazone type dyes are more preferably compounds represented by the following Formula (4).

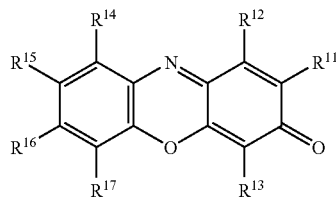

Formula (4)

In the Formula (4), at least one of $R^{11}$, $R^{12}$, $R^{13}$, $R^{14}$, $R^{15}$, $R^{16}$, and $R^{17}$ is -(Het)$_j$-$\{(B^1)_p\text{-}(Q^1)_q\text{-}(B^2)_r\}_n$—$C^1$ and the remaining groups each independently represent a hydrogen atom or a substituent.

In -(Het)$_j$-$\{(B^1)_p\text{-}(Q^1)_q\text{-}(B^2)_r\}_n$—$C^1$, Het represents an oxygen atom or a sulfur atom; $B^1$ and $B^2$ each independently represent an arylene group, a heteroarylene group, or a divalent alicyclic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5; n represents an integer of 1 to 3; and (p+r)×n is an integer of 3 to 10, and preferably an integer of 3 to 5. When p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $\{(B^1)_p\text{-}(Q^1)_q\text{-}(B^2)_r\}$ may be the same or different.

Herein, the preferable ranges of Het, $B^1$, $B^2$, $Q^1$, $C^1$, j, p, q, r, and n have the same meaning as the above-mentioned ranges preferable of Het, $B^1$, $B^2$, $Q^1$, $C^1$, j, p, q, r, and n of the above-mentioned Formula (2).

The substituents in the Formula (4) are the substituent group V, and preferably an amino group, a halogen atom, a hydroxy group, a cyano group, a carbamoyl, a sulfamoyl, an alkoxy group, an aryloxy group, an acyloxy group, an acylamino group, an ureido group, an imido group, an alkylthio group, an arylthio group, a heteroarylthio group, an alkoxycarbonyl group, an aryloxycarbonyl group, an alkyl group, an aryl group, and a heteroaryl group, and more preferably an amino group, a halogen atom, a hydroxy group, a carbamoyl group, an acyloxy group, an acylamino group, an imido group, an alkylthio group, an arylthio group, a heteroarylthio group, an alkoxycarbonyl group, an aryloxycarbonyl group, an alkyl group, and an aryl group.

Further, in the Formula (4), it is more preferable that at least one of $R^{11}$, $R^{14}$, and $R^{16}$ represents -(Het)$_j$-$\{(B^1)_p\text{-}(Q^1)_q\text{-}(B^2)_r\}_n$—$C^1$.

Specific examples of the dichroic dye of the anthraquinone dye and/or phenoxazone dye usable in the present invention is described below, but the present invention is not limited to these examples.

No. 1-1

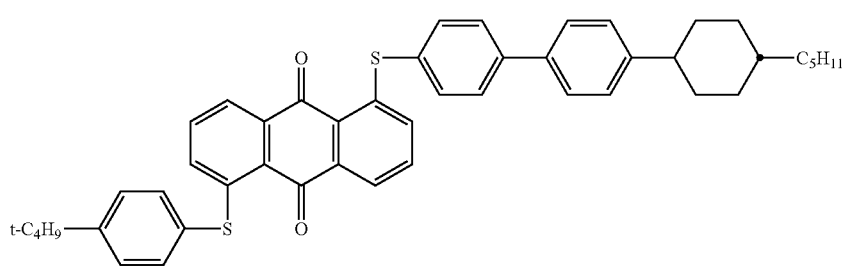

-continued
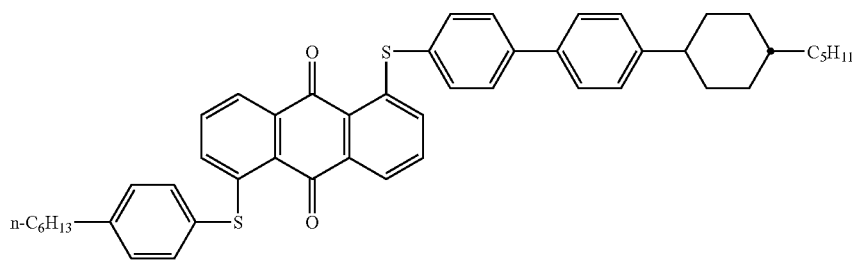
No. 1-2
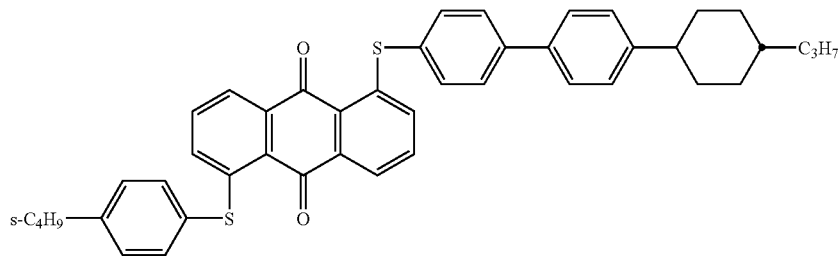
No. 1-3
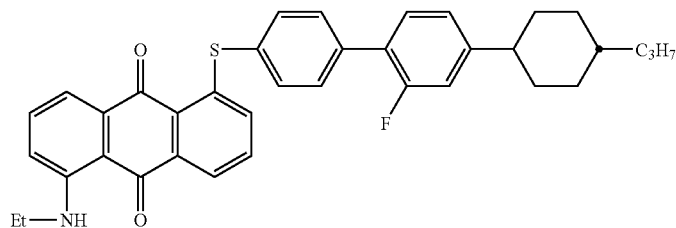
No 1-4
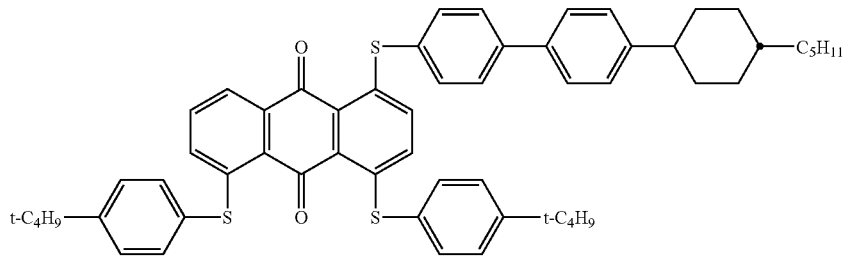
No. 1-5
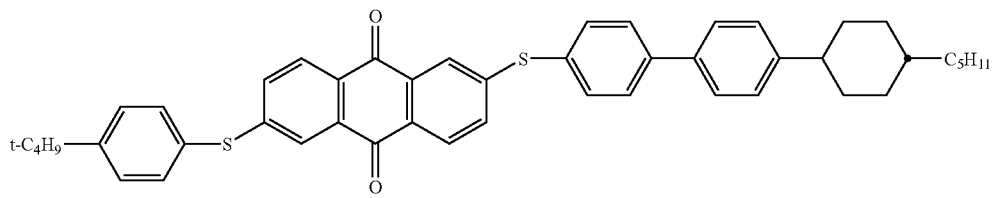
No. 1-6
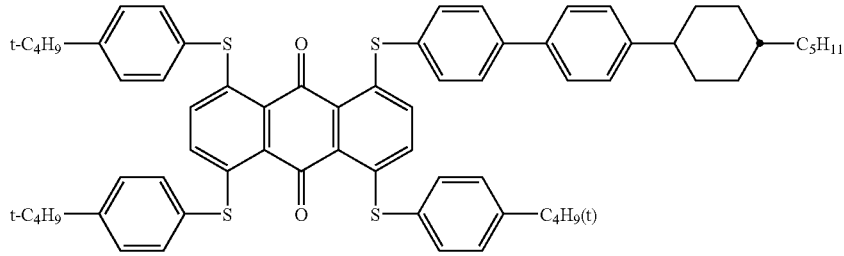
No. 1-7

-continued
No. 1-8
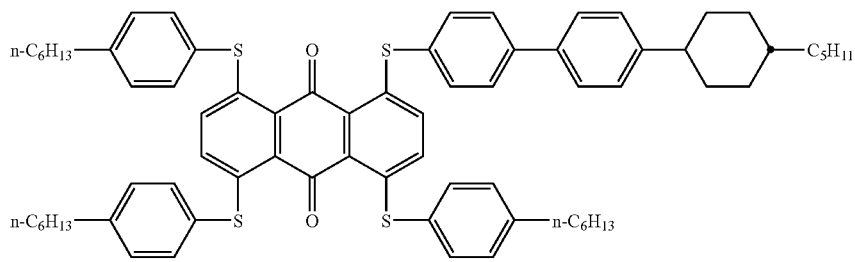
No. 1-9
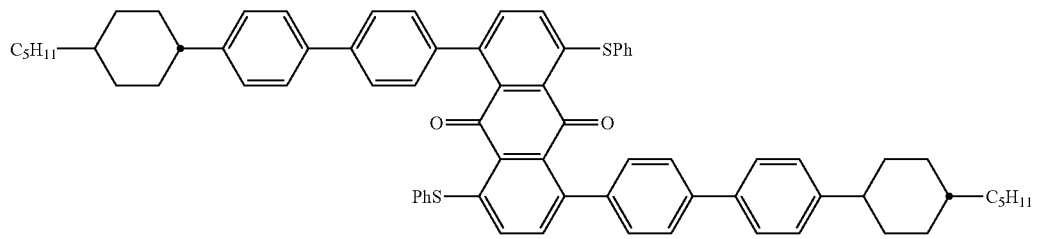
No. 1-10
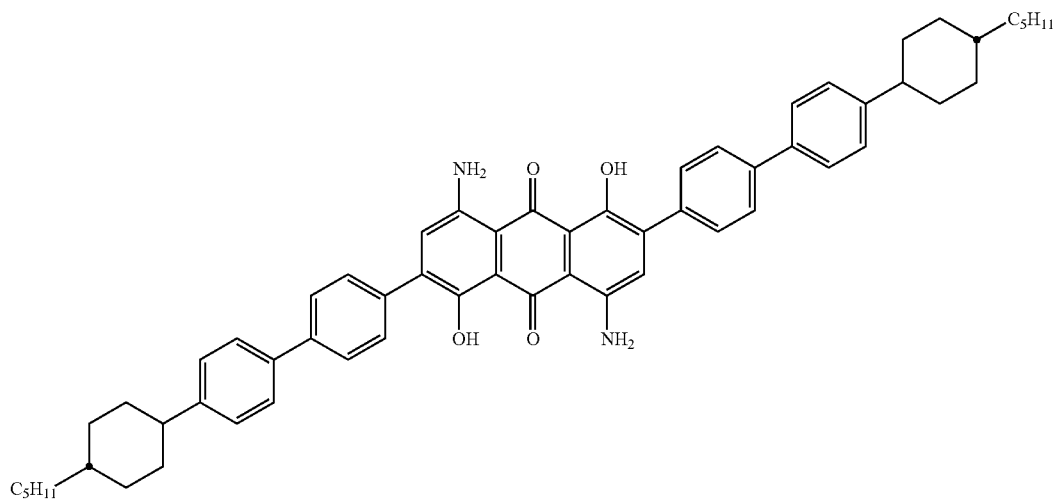
No. 1-11
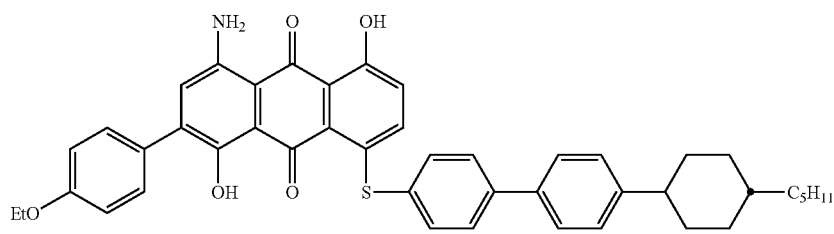
No. 1-12
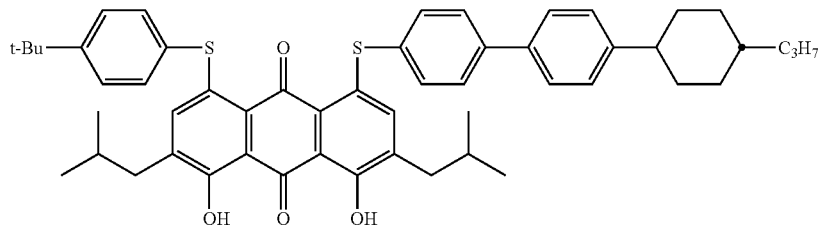

-continued
No. 1-13
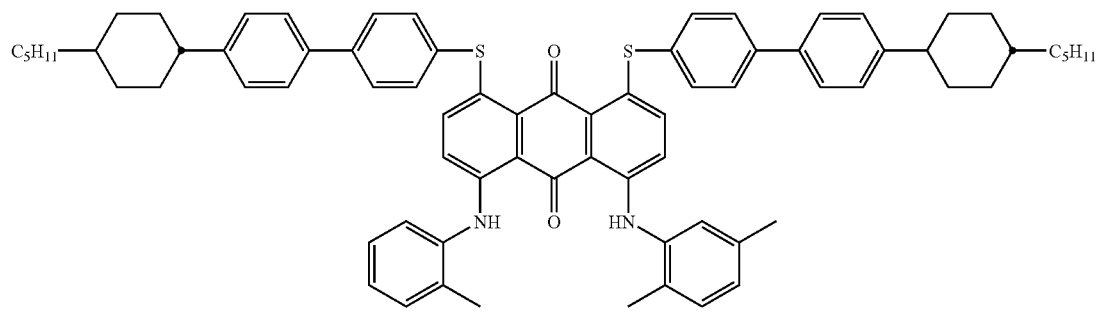
No. 1-14
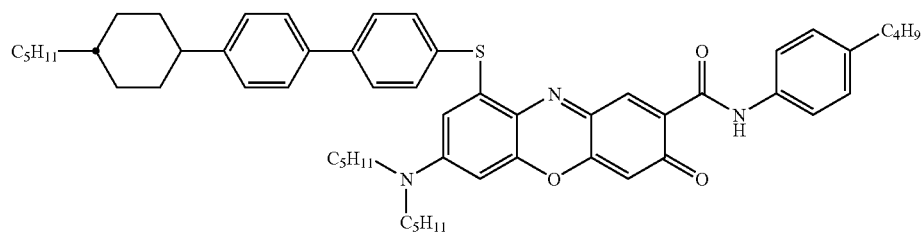
No. 1-15
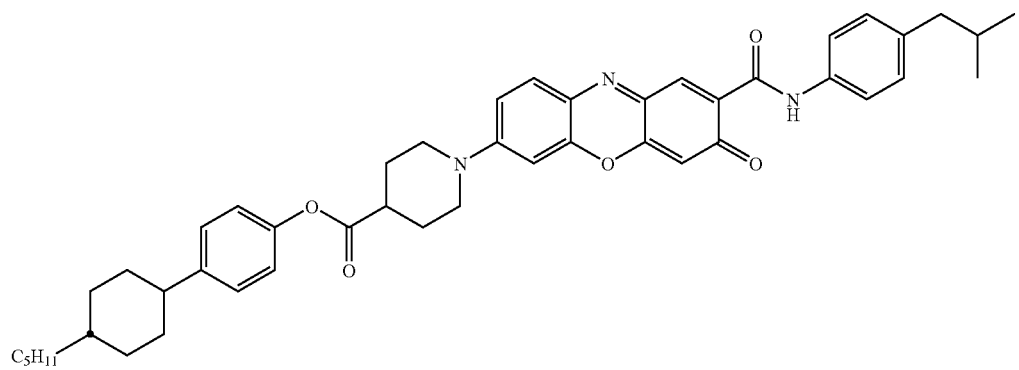
No. 1-16
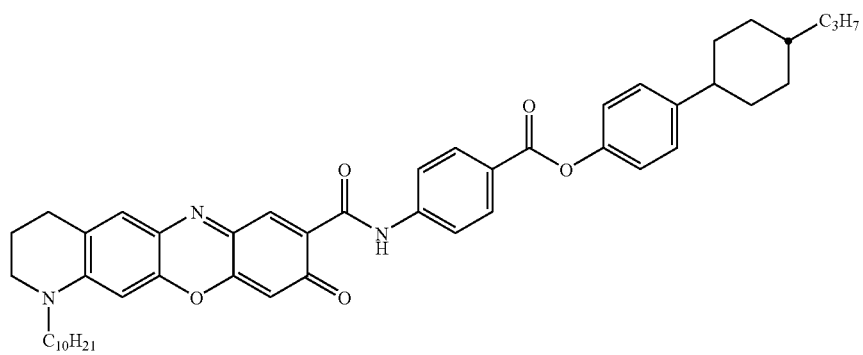
No. 1-17
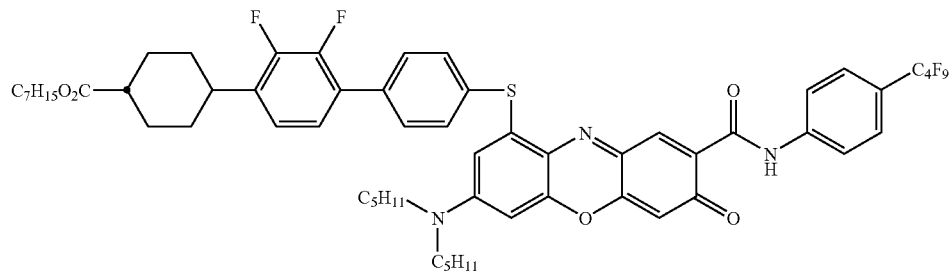

Hereinafter, practical examples of azo type dichroic dyes usable for the present invention are shown below, but the present invention is not limited to these practical examples.

not particularly limited, but preferably the ratio of the dichroic dye is 0.1 to 15% by mass, and more preferably 0.5 to 6% by mass.

No. 2-1
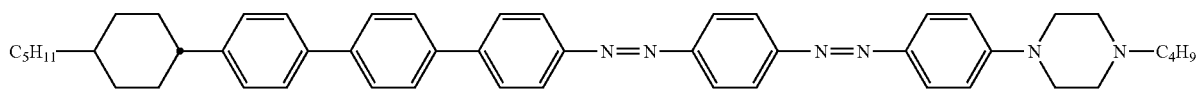

No. 2-2
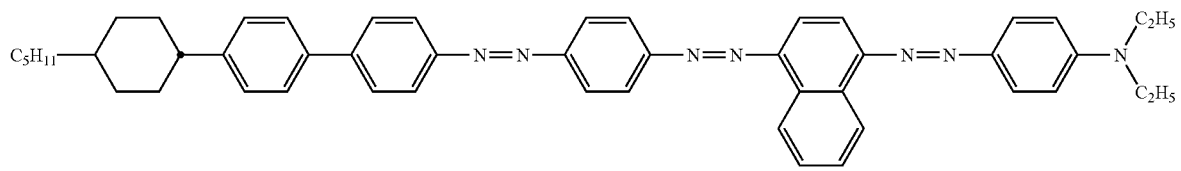

No. 2-3
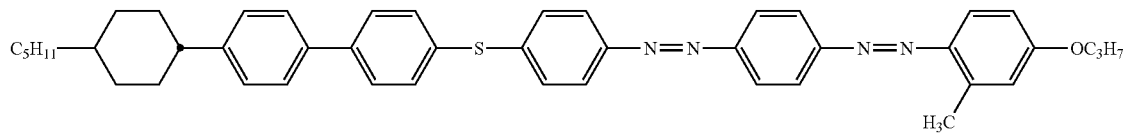

Hereinafter, practical examples of dioxazine type dichroic dyes and merocyanine type dichroic dyes usable for the present invention are shown below, but the present invention is not limited to these practical examples.

The dichroic dye is dissolved in the host liquid crystal (a mixture of a cross-linked polymer and a low molecular weight liquid crystal) by means of mechanical stirring, heating, applying ultrasonic wave, and combining them.

No. 3-1
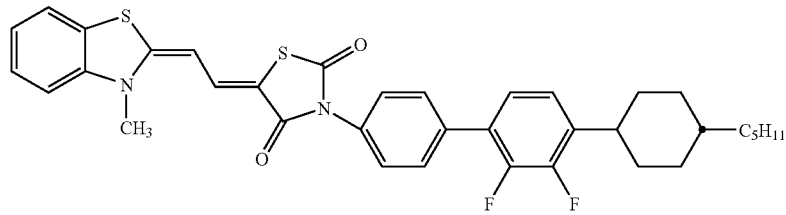

No. 3-2
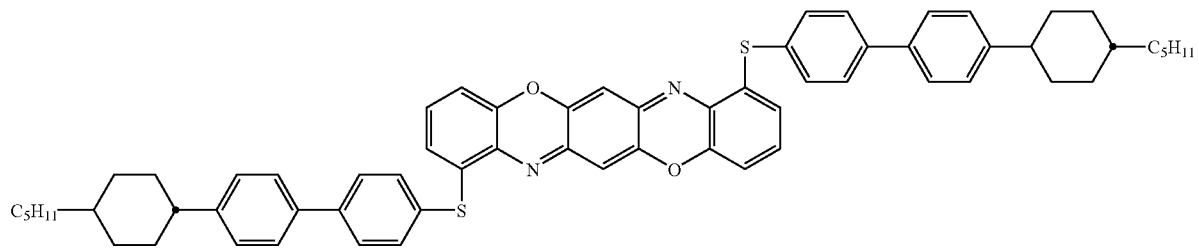

A dichroic dye having a substituent represented by the above-mentioned Formula (2) can be synthesized by combining conventionally known methods. For example, it can be synthesized by the method described in JP-A No. 2003-192664.

The ratio of the dichroic dye based on the host liquid crystal in the liquid crystal composition of the present invention is Additionally, known method can be employed for other preparation of the liquid crystal composition of the present invention.

The liquid crystal element of the present invention includes a pair of electrodes, at least one of which is a transparent electrode, and a liquid crystal layer disposed between the pair of electrodes, in which the liquid crystal layer contains the liquid crystal composition as described in the above.

An electrode substrate used in the liquid crystal element of the present invention is usually a glass or plastic substrate, and a plastic substrate is preferable. The plastic substrate used in the present invention may be of an acrylic resin, a polycarbonate resin, and an epoxy resin and practical examples are triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and polyimide (PI). A preferable polymer is polyethylene terephthalate (PET).

The thickness of the plastic substrate is not particularly limited, and preferably 30 μm to 700 μm, more preferably 40 μm to 200 μm, and even more preferably 50 μm to 150 μm. Further, in any case, the haze is preferably 3% or lower, more preferably 2% or lower, and even more preferably 1% or lower and the total luminous transmittance is preferably 70% or higher, more preferably 80% or higher, and even more preferably 90% or higher.

The plastic substrate may contain resin property-reforming agents, such as a plasticizer, a dye, a pigment, an antistatic agent, an ultraviolet absorbent, an antioxidant, inorganic fine particles, a separation promoting agent, a leveling agent, and a lubricant, as occasion demands, unless the effects of the present invention is impaired.

The plastic substrate may be either light-transmissive or light non-transmissive. In the case of a light non-transmissive substrate, a white substrate having a light reflectivity may be used. A white substrate is, for example, a plastic substrate containing an inorganic pigment such as titanium oxide or zinc oxide. When the substrate includes a display surface, the substrate is necessary to have a light transmittance of at least light in the visible range.

The substrate is specifically described, for example, from pages 218 to 231 of Liquid Crystal Device Handbook, edited by Committee 142 of Japan Society for the Promotion of Science, Nikkan Kogyo Shimbunsha, 1989.

On the substrate, an electrode layer is formed, and the electrode layer is preferably a transparent electrode. The transparent electrode layer may be formed of, for example, indium oxide, indium tin oxide (ITO), or tin oxide. The transparent electrode is described, for example, from pages 232 to 239 of Liquid Crystal Device Handbook, edited by Committee 142 of Japan Society for the Promotion of Science, Nikkan Kogyo Shimbunsha, 1989. The transparent electrode can be formed by a sputtering method, a sol-gel method, or a printing method.

In order to orient the liquid crystal in the liquid crystal element of the present invention, it is preferred to form a layer which is subjected to an orientation treatment on the surface at which the liquid crystal comes into contact with the substrate. The orientation treatment includes a method in which a quaternary ammonium salt is coated and oriented, a polyimide is coated and subjected to a rubbing treatment, SiOx, is vapor-deposited in an oblique direction to be oriented, and a light irradiation method by utilizing a photo-isomerization for orientation. Orientation film is described, for example, from pages 240 to 256 of Liquid Crystal Device Handbook, edited by Committee 142 of Japan Society for the Promotion of Science, Nikkan Kogyo Shimbunsha, 1989.

The liquid crystal element of the present invention can be manufactured by disposing substrates ao as to face each other with an space of 1 to 50 μm by the use of spacers or the like, and injecting the liquid crystal composition of the present invention into the space. The spacer is described, for example, from pages 257 to 262 of Liquid Crystal Device Handbook, edited by Committee 142 of Japan Society for the Promotion of Science, Nikkan Kogyo Shimbunsha, 1989. The liquid crystal composition of the present invention can be disposed in the space between the substrates by applying or printing the liquid crystal composition on the substrate.

The liquid crystal element of the present invention can be driven by a simple matrix driving system or an active matrix driving system using a thin film transistor (TFT) or the like. The driving system is described, for example, from pages 387 to 460 of Liquid Crystal Device Handbook, edited by Committee 142 of Japan Society for the Promotion of Science, Nikkan Kogyo Shimbunsha, 1989, which can be utilized as the driving system of the liquid crystal element of the present invention.

Voltage in a low frequency region and a high frequency region may be employed for driving the liquid crystal element of the present invention. A preferred range of the frequency region of voltage to be applied to the liquid crystal layer in the liquid crystal element in the present invention varies with the type of the liquid crystal composition to be used, a cross-over frequency of the liquid crystal composition or the like, and generally the frequency region of an electric field to be applied to the liquid crystal composition is preferably 0.1 Hz to 10 MHz, or more preferably 1 Hz to 1 MHz. The low frequency region is preferably 0.1 Hz to 100 kHz, more preferably 1 Hz to 10 kHz, or most preferably 10 Hz to 10 kHz. The high frequency region is preferably 100 Hz to 10 MHz, more preferably 100 Hz to 1 MHz, or most preferably 1 kHz to 1 MHz.

The liquid crystal display using the liquid crystal element of the present invention may employ any system. The liquid crystal element of the present invention may be used in a laminate-type GH mode disclosed in JP-A Nos. 10-67990, 10-239702, 10-133223, 10-339881, 11-52411, and 11-64880, 2000-221538, or a GH mode using micro capsules disclosed in JP-A No. 11-24090.

In the liquid crystal element of the present invention, one liquid crystal composition may contain a plurality of mixed dichroic dyes. The color of the liquid crystal composition may also be optional. For example, in the case where a black color liquid crystal composition is prepared by mixing a plurality of dichroic dyes, the liquid crystal element may be used for monochromic display by voltage application. Also, liquid crystal compositions colored in red, green, and blue respectively are prepared and these three kind compositions are arranged in parallel on a substrate to fabricate a liquid crystal element for color display. Further, the liquid crystal element of the present invention may have a laminated structure. Examples of the laminated structure may be a three-layered structure comprising layers of respectively liquid crystal compositions colored in yellow, magenta, and cyan; a two-layered structure comprising two layers of which one is formed by arranging liquid crystal compositions colored in yellow, magenta, and cyan in parallel and the other of which is formed thereon by arranging liquid crystal compositions colored in complementary colors, that is, in blue, green, and red colors, in parallel; and a two-layered structure comprising two layers of which one is formed by using a liquid crystal composition colored in black and the other is formed thereon by arranging liquid crystal compositions colored in red, blue, and green in parallel.

EXAMPLES

Next, the present invention will be described more in detail by examples, however it is not intended that the present invention be limited to the illustrated examples.

Example 1
(Synthesis of the Liquid Crystalline Siloxane Polymer)
A liquid crystalline siloxane polymer (1) was synthesized along the following scheme.
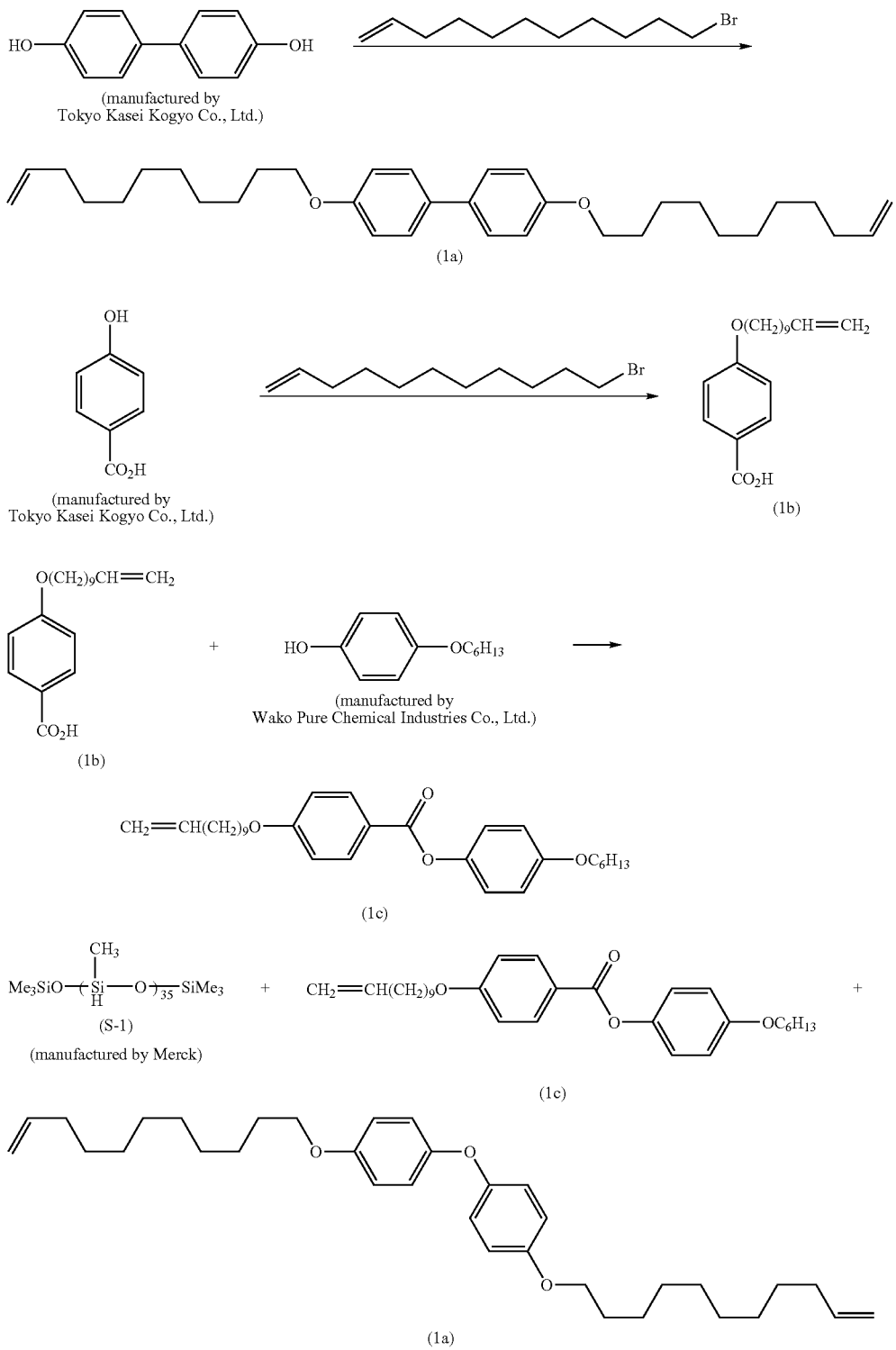

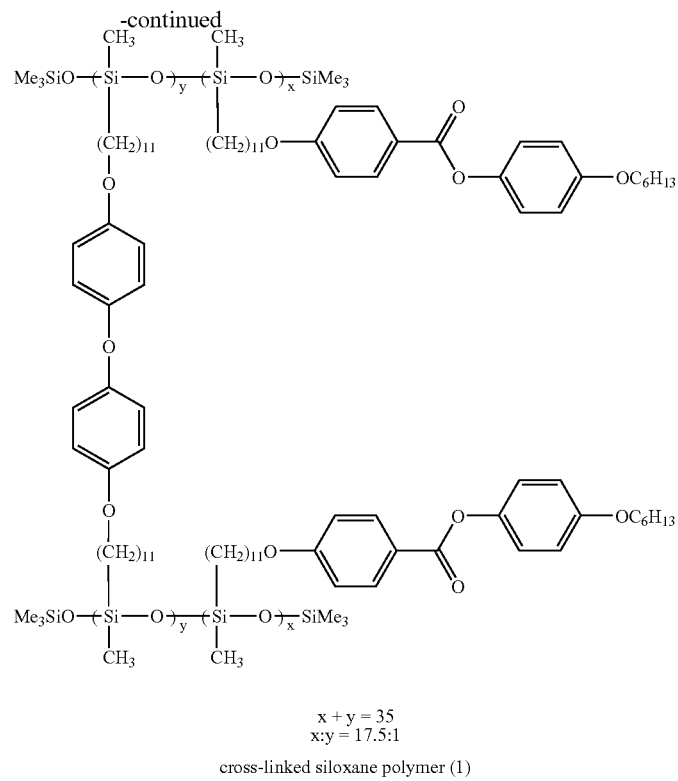

x + y = 35
x:y = 17.5:1 cross-linked siloxane polymer (1)

(Synthesis of the Compound 1a)

At first, a DMF solution (10 ml) containing 4,4'-biphenol (1 g), 11-bromo-1-undecene (2.45 ml) (manufactured by ALDRICH), and potassium carbonate (1.86 g) was stirred at 100° C. for three hours. The obtained reaction solution was added to chloroform/1N hydrochloric acid to wash the organic layer with 1N hydrochloric acid, and the organic layer was dried with magnesium sulfate, and concentrated in a reduced pressure. The concentrated residue was refined by silica gel column chromatography (development solvent: chloroform) to obtain a compound 1a (1.97 g).

(Synthesis of Compound 1b)

Potassium iodide (0.22 g) was added to a water (40 ml)/ethanol (160 ml) mixed solution containing 4-hydroxybenzoic acid (29.3 g), 11-bromo-1-undecene (50 g), and potassium hydroxide (32 g), and the resulting mixture was stirred at 80° C. for 20 hours. A concentrated hydrochloric acid solution was added to the obtained reaction solution to adjust the solution acidic and coarse crystal was obtained by filtration. The obtained coarse crystal was dissolved in an aqueous potassium hydroxide solution and the solution was adjusted to be acidic and filtered to obtain a compound 1b (51.8 g).

(Synthesis of Compound 1c)

A chloroform solution (50 ml) of dicyclohexylcarbodiimide (12.8 g) was dropwise added to a chloroform solution (150 ml) containing the compound 1b (15 g), p-hexyloxyphenol (8.0 g) (manufactured by Wako Pure Chemical Industries Co., Ltd.), and dimethylaminopyridine (1.26 g), and the resulting mixture was stirred for 1 hour under heating and refluxing conditions. The obtained reaction solution was added to a 1N hydrochloric acid solution, and the obtained organic layer was washed with a 1N hydrochloric acid solution, dried with magnesium sulfate, and then concentrated in reduced pressure. The concentrated residue was refined by silica gel column chromatography (development solvent: ethyl acetate/hexane=1/5), and recrystallized in ethanol to obtain a compound 1c (10.6 g).

(Synthesis of Siloxane Polymer (1))

A small amount of dichlorodicyclopentadienyl platinum was added to a toluene solution (20 ml) containing the compound 1a (60 mg), the compound 1c (2 g), and a siloxane polymer (S-1) (0.26 g) (manufactured by Merck), and the resulting mixture was stirred at 80° C. for 6 hours in nitrogen atmosphere. After the reaction solution was cooled, isopropyl alcohol was added and the obtained precipitate was separated by filtration. The precipitate was dissolved in toluene and isopropyl alcohol was added again to form precipitate. These steps were repeated to remove impurities and obtain liquid crystalline siloxane polymer (1) (1.8 g). (the compound was identified by elementary analysis, NMR, and MASS spectroscopy). The obtained polymer has white solid appearance. The transition temperature of the obtained liquid crystalline siloxane polymer was measured to find that the transition temperature from glass state to the smectic A phase was 62° C. and the transition temperature from the smectic A phase to the isotropic phase was 132° C.

1H-NMR (CDCl$_3$)

δ: -0.05-0.28 (3H, b), 0.32-0.61 (2.1H, b), 0.78-0.97 (2.8H, b), 1.08-1.53 (22.5H, b), 1.65-1.85 (4H, b), 3.82-4.04 (4H, b), 6.78-6.95 (4H, b), 6.95-7.10 (1.89H, b), 7.32-7.45 (0.22H, b), 7.99-8.13 (1.89H, b)

As the proton number in the above 1H-NMR peaks are described the numbers of repeating units of the polymer.

(Synthesis of Dichroic Dye)

Dichroic dyes (1-8) was synthesized according to a method disclosed in JP-A No. 2003-192664. Dichroic dyes (1-14) was synthesized according to a method disclosed in JP-A No. 2003-120334.

Example 2

(Preparation of Liquid Crystal Composition (1))

A mixture of the dichroic dye (1-8) 5 mg, a siloxane polymer (1: having two-frequency drivable property) 26.4 mg, and a two-frequency drivable liquid crystal (H-1) 73.6 mg described in Applied Physics Letters, Vol. 25, 186-188 (1974) was heated for 1 hour by a hot plate at 180° C., and then, the mixture was cooled to a room temperature and left overnight to obtain the liquid crystal composition (1).

Two-Frequency Drivable Liquid Crystal (H-1)

(1 : 1 mixture)

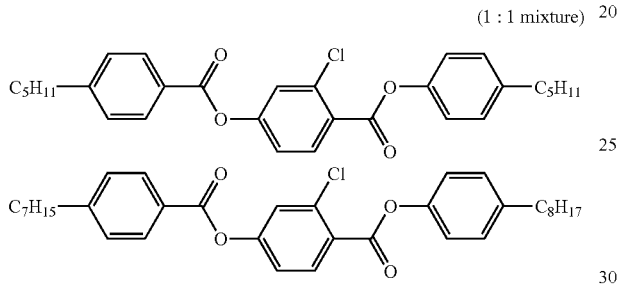

(Preparation of Liquid Crystal Compositions (2) to (10))

The liquid crystalline siloxane polymers (2) to (10) exemplified above in the practical examples were synthesized according to the synthesis method of the above-mentioned liquid crystalline siloxane polymer (1). The liquid crystal compositions (2) to (10) were produced in the same method as the liquid crystal composition (1), except that siloxane polymers (2) to (10) were mixed in place of the siloxane polymer (1).

(Preparation of Liquid Crystal Compositions (11) to (20))

The liquid crystal compositions (11) to (20) were produced in the same method as the liquid crystal compositions (1) to (10), except that the dichroic dye (1-14) 1 mg was used in place of the dichroic dye (1-8) 5 mg.

(Preparation of Comparative Liquid Crystal Compositions (1) and (2))

The comparative liquid crystal composition (1) was produced in the same method as the liquid crystal composition (1), except that the following siloxane polymers (S-2) described in JP-A No. 9-40955.

Also, the comparative liquid crystal composition (2) was produced in the same method as the comparative liquid crystal composition (1), except that the dichroic dye (1-14) 1 mg was used in place of the dichroic dye (1-8) 5 mg.

(S-2)

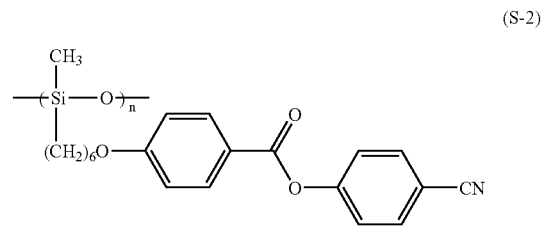

Example 3

(Fabrication of Liquid Crystal Element)

Each liquid crystal composition obtained in the above-mentioned methods was injected at 150° C. into a commercialized liquid crystal cell (equipped with an ITO transparent electrode, a glass plate 0.7 mm, a cell gap 8 μm, an epoxy resin sheet-attached, manufactured by E.H.C. Inc.) to produce a liquid crystal element. No aligned film was formed on the ITO transparent electrode.

(Evaluation of Two-Frequency Drivable Property)

Rectangular a.c. voltage of a low frequency (35 V, 100 Hz) was applied to each produced liquid crystal element and the transmittance was measured by spectrophotometer (UV-2400 PC, manufactured by Shimadzu Corp.). Next, rectangular a.c. voltage of a high frequency (35 V, 10 kHz) was applied and the transmittance was measured. The results are shown in Table 1.

TABLE 1

| Liquid Crystal Composition | Siloxane Polymer | Dichroic Dye | Abs (100 Hz) | Abs (10 kHz) | Remarks |
|---|---|---|---|---|---|
| 1 | 1 | (1-8) | 0.15 | 1.38 | Present Invention |
| 2 | 2 | (1-8) | 0.15 | 1.34 | Present Invention |
| 3 | 3 | (1-8) | 0.14 | 1.26 | Present Invention |
| 4 | 4 | (1-8) | 0.14 | 1.41 | Present Invention |
| 5 | 5 | (1-8) | 0.14 | 1.44 | Present Invention |
| 6 | 6 | (1-8) | 0.14 | 1.60 | Present Invention |
| 7 | 7 | (1-8) | 0.14 | 1.47 | Present Invention |
| 8 | 8 | (1-8) | 0.14 | 1.31 | Present Invention |
| 9 | 9 | (1-8) | 0.14 | 1.51 | Present Invention |
| 10 | 10 | (1-8) | 0.14 | 1.58 | Present Invention |
| 11 | 1 | (1-14) | 0.14 | 1.43 | Present Invention |
| 12 | 2 | (1-14) | 0.14 | 1.38 | Present Invention |
| 13 | 3 | (1-14) | 0.13 | 1.32 | Present Invention |
| 14 | 4 | (1-14) | 0.14 | 1.48 | Present Invention |
| 15 | 5 | (1-14) | 0.14 | 1.49 | Present Invention |
| 16 | 6 | (1-14) | 0.13 | 1.64 | Present Invention |
| 17 | 7 | (1-14) | 0.14 | 1.56 | Present Invention |
| 18 | 8 | (1-14) | 0.14 | 1.36 | Present Invention |

TABLE 1-continued

| Liquid Crystal Composition | Siloxane Polymer | Dichroic Dye | Abs (100 Hz) | Abs (10 kHz) | Remarks |
|---|---|---|---|---|---|
| 19 | 9 | (1-14) | 0.14 | 1.54 | Present Invention |
| 20 | 10 | (1-14) | 0.13 | 1.61 | Present Invention |
| Comparative example 1 | S-2 | (1-8) | 0.15 | 0.17 | comparative example |
| Comparative example 2 | S-2 | (1-14) | 0.13 | 0.15 | comparative example |

As shown in Table 1, it is understood that while the liquid crystal elements of Comparative examples (1) and (2) are perpendicularly aligned as they are at the low frequency and the high frequency, the liquid crystal elements within the scope of the present invention are perpendicularly aligned by application of voltage of the low frequency and changed to horizontal alignment by application of voltage of the high frequency, and thus show the two-frequency drivable property. Also, the response rate was measured for the above-mentioned liquid crystal elements to find that the liquid crystal elements within the scope of the present invention show quick response.

(Absorbance Measurement)

The absorbance of each produced liquid crystal element was measured by spectrophotometer (UV-2400 PC, manufactured by Shimadzu Corp.). The results are shown in Table 2.

TABLE 2

| Liquid Crystal Composition | Siloxane Polymer | Dichroic Dye | Absorbance | Remarks |
|---|---|---|---|---|
| 1 | 1 | (1-8) | 1.31 | Present Invention |
| 2 | 2 | (1-8) | 1.28 | Present Invention |
| 3 | 3 | (1-8) | 1.15 | Present Invention |
| 4 | 4 | (1-8) | 1.33 | Present Invention |
| 5 | 5 | (1-8) | 1.25 | Present Invention |
| 6 | 6 | (1-8) | 1.30 | Present Invention |
| 7 | 7 | (1-8) | 1.45 | Present Invention |
| 8 | 8 | (1-8) | 1.28 | Present Invention |
| 9 | 9 | (1-8) | 1.31 | Present Invention |
| 10 | 10 | (1-8) | 1.29 | Present Invention |
| 11 | 1 | (1-14) | 1.41 | Present Invention |
| 12 | 2 | (1-14) | 1.34 | Present Invention |
| 13 | 3 | (1-14) | 1.30 | Present Invention |
| 14 | 4 | (1-14) | 1.44 | Present Invention |
| 15 | 5 | (1-14) | 1.39 | Present Invention |
| 16 | 6 | (1-14) | 1.35 | Present Invention |
| 17 | 7 | (1-14) | 1.54 | Present Invention |
| 18 | 8 | (1-14) | 1.33 | Present Invention |
| 19 | 9 | (1-14) | 1.31 | Present Invention |
| 20 | 10 | (1-14) | 1.35 | Present Invention |
| Comparative example 1 | S-2 | (1-8) | 1.07 | comparative example |
| Comparative example 2 | S-2 | (1-14) | 1.09 | comparative example |

From the results shown in Table 2, it is understood that the liquid crystal elements within the scope of the present invention have increased absorbance since the axial direction is made random among the liquid crystal droplets owing to the cross-linked siloxane polymers as compared with those of the liquid crystal elements of Comparative Examples using non-cross-linked siloxane polymers.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal composition comprising a cross-linked polymer having a liquid crystalline group in a side chain, a low molecular weight liquid crystal, and a dichroic dye, wherein the dielectric constant anisotropy of the liquid crystalline group bonded to the cross-linked siloxane polymer and of the low molecular weight liquid crystal is changed from positive to negative by increasing the frequency of the voltage to be applied.

2. The liquid crystal composition according to claim 1, wherein the cross-linked polymer is a cross-linked siloxane polymer having a liquid crystalline group in a side chain.

3. The liquid crystal composition according to claim 2, wherein the dielectric constant anisotropy of the composition is changed from positive to negative by increasing the frequency of a voltage to be applied.

4. The liquid crystal composition according to claim 3, wherein the cross-linked siloxane polymer comprises a repeating unit represented by the following Formula (1):

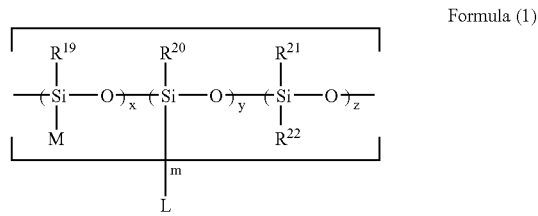

Formula (1)

wherein $R^{19}$, $R^{20}$, $R^{21}$, and $R^{22}$ each independently represent an alkyl group or an aryl group; M represents a liquid crystalline group; L represents a cross-linking group; m represents an integer of 2 or larger; x represents a number from 1 to 100; y represents a number of 0.1 or larger; z represents a number of 0 or larger; and when x is 2 or larger, groups represented by M may be the same or different.

5. The liquid crystal composition according to claim 4, wherein a silicon atom of the siloxane polymer and the cross-linking group L are bonded with each other by a carbon atom.

6. The liquid crystal composition according to claim 4, wherein M in the Formula (1) has a structure represented by the following Formula (5):

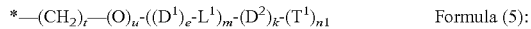

$$*\text{—}(CH_2)_t\text{—}(O)_u\text{-}((D^1)_e\text{-}L^1)_m\text{-}(D^2)_k\text{-}(T^1)_{n1} \quad \text{Formula (5):}$$

wherein, * represents a portion of attaching to the siloxane polymer; $D^1$ and $D^2$ each independently represent an arylene group, a heteroarylene group, or a divalent alicyclic hydrocarbon group; $L^1$ represents a divalent linking group; $T^1$ represents an alkyl group, an alkoxy group, an alkoxycarbonyl group, an acyl group, an acyloxy group, a halogen atom, or a cyano group; t represents an integer of 2 to 20; u represents 0 or 1; e represents an integer of 1 to 3; m represents an integer of 1 to 3; k represents 1 or 2; n1 represents an integer of 1 to 5; and e×m+k is an integer of 2 to 5.

7. The liquid crystal composition according to claim 6, wherein the structure represented by the Formula (5) is a structure represented by one of the following formula (6-1) to (6-12):

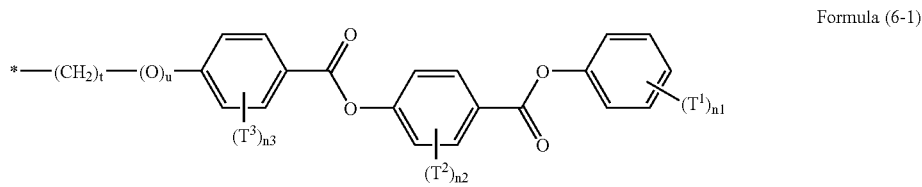

Formula (6-1)

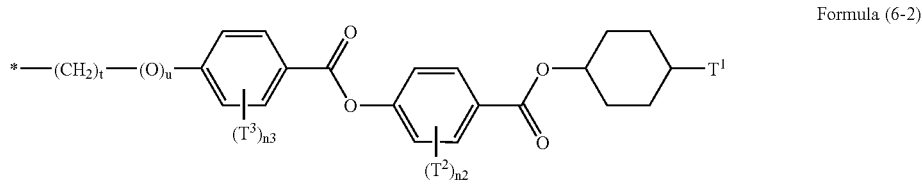

Formula (6-2)

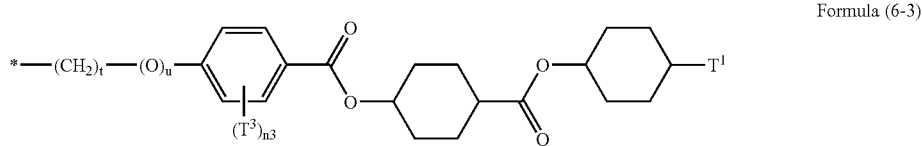

Formula (6-3)

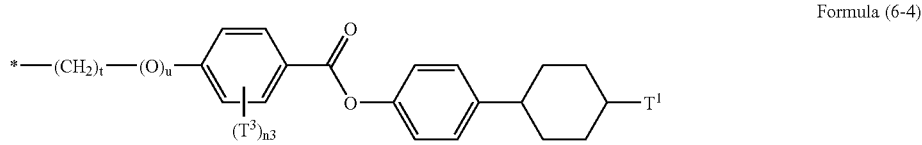

Formula (6-4)

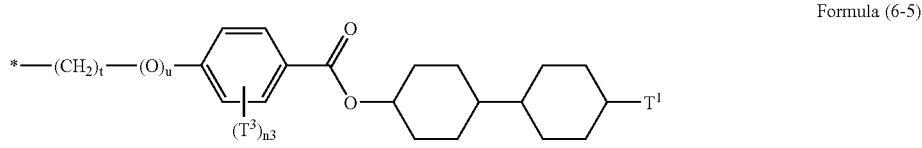

Formula (6-5)

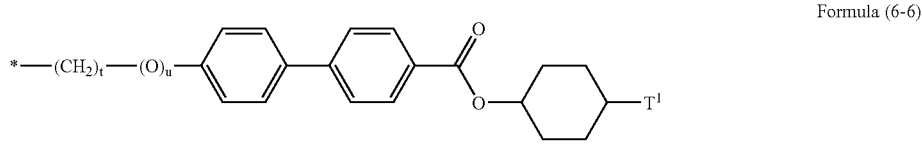

Formula (6-6)

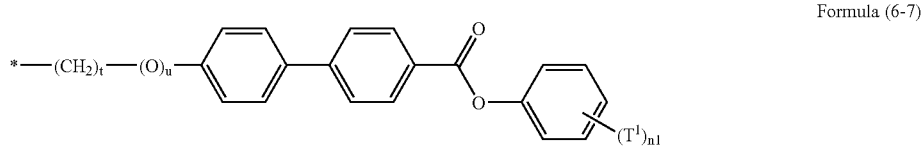

Formula (6-7)

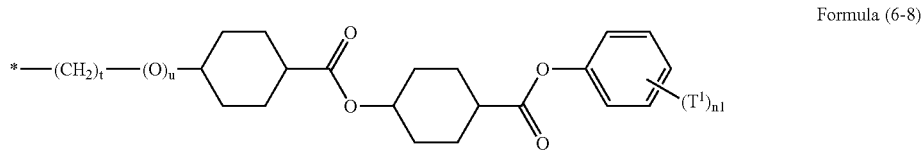

Formula (6-8)

-continued

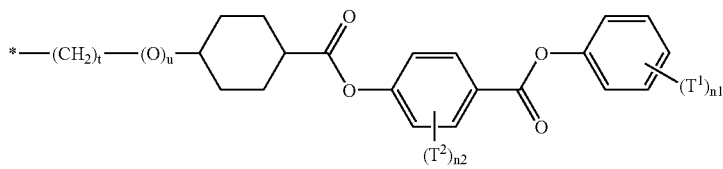
Formula (6-9)

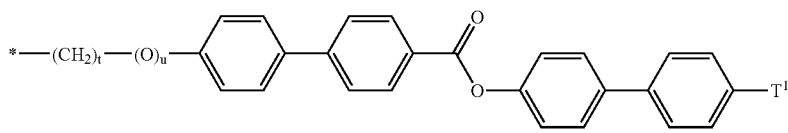
Formula (6-10)

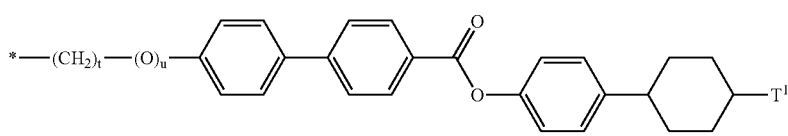
Formula (6-11)

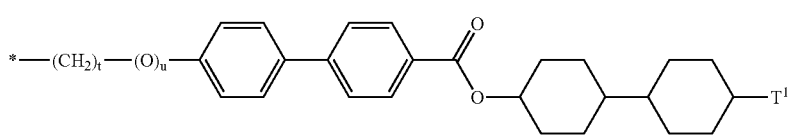
Formula (6-12)

wherein t, u, $T^1$, and n1 each have the same meaning as t, u, $T^1$, and n1, respectively, in the Formula (5); $T^2$ and $T^3$ each independently represent a halogen atom, a cyano group, an alkoxy group, or an alkyl group; and n2 and n3 each independently represent an integer of 1 to 4.

8. The liquid crystal composition according to claim 4, wherein x represents a number from 3 to 50; y represents a number from 0.1 to 10 or larger; and z represents a number from 0 to 50 in the Formula (1).

9. The liquid crystal composition according to claim 1, wherein the low molecular weight liquid crystal is a nematic liquid crystal or a smectic liquid crystal.

10. The liquid crystal composition according to claim 1, wherein at least one of the dichroic dye has a substituent represented by the following Formula (2):

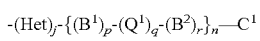     Formula (2):

wherein Het represents an oxygen atom or a sulfur atom; $B^1$ and $B^2$ each independently represent an arylene group, a heteroarylene group, or a divalent alicyclic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r each independently represent an integer of 0 to 5; n represents an integer of 1 to 3; and (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $\{(B^2)_p\text{-}(Q^1)_q\text{-}(B^2)_r\}$ may be the same or different.

11. The liquid crystal composition according to claim 1, wherein at least one of the dichroic dye is a compound represented by the following Formula (3):

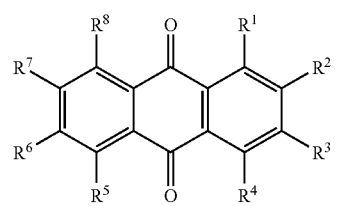
Formula (3)

wherein at least one of $R^1$, $R^2$, $R^3$, $R^4$, $R^5$, $R^6$, $R^7$, and $R^8$ is -(Het)$_j$-$\{(B^1)_p$-$(Q^1)_q$-$(B^2)_r\}_n$—$C^1$ and the remaining groups each independently represent a hydrogen atom or a substituent; Het represents an oxygen atom or a sulfur atom; $B^1$ and $B^2$ each independently represent an arylene group, a heteroarylene group, or a divalent alicyclic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r each independently represent an integer of 0 to 5; n represents an integer of 1 to 3; and (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $\{(B^1)_p\text{-}(Q^1)_q\text{-}(B^2)_r\}$ may be the same or different.

12. The liquid crystal composition according to claim 1, wherein at least one of the dichroic dye is a compound represented by the following Formula (4):

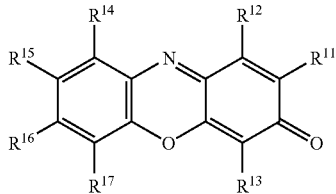

Formula (4)

wherein at least one of $R^{11}$, $R^{12}$, $R^{13}$, $R^{14}$, $R^{15}$, $R^{16}$, and $R^{17}$ is $-(Het)_j-\{(B^1)_p-(Q^1)_q-(B^2)_r\}_n-C^1$ and the remaining groups each independently represent a hydrogen atom or a substituent; Het represents an oxygen atom or a sulfur atom; $B^1$ and $B^2$ each independently represent an arylene group, a heteroarylene group, or a divalent alicyclic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r each independently represent an integer of 0 to 5; n represents an integer of 1 to 3; and (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different when n is 2 or larger, two or more groups represented by $\{(B^1)_p-(Q^1)_q-(B^2)_r\}$ may be the same or different.

13. A liquid crystal element comprising a pair of electrodes of which at least one is a transparent electrode and a liquid crystal layer between the pair of the electrodes, wherein the liquid crystal layer contains the liquid crystal composition according to claim 1.

14. A cross-linked siloxane polymer comprising a repeating unit represented by the following Formula (1):

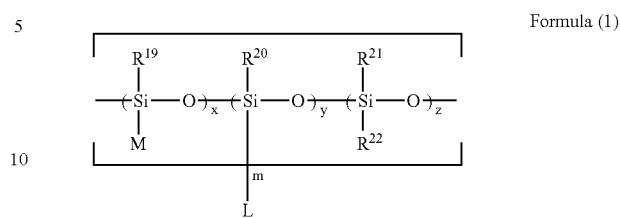

Formula (1)

wherein $R^{19}$, $R^{20}$, $R^{21}$, and $R^{22}$ each independently represent an alkyl group or an aryl group; M represents a liquid crystalline group; L represents a cross-linking group bonding with a silicon atom of the siloxane polymer via a carbon atom; m represents an integer of 2 or larger; x represents a number from 1 to 100; y represents a number of 0.1 or larger; z represents a number of 0 or larger; and when x is 2 or larger, groups represented by M may be the same or different.

15. The cross-linked siloxane polymer according to claim 14, wherein M in the Formula (1) has a structure represented by the following Formula (5):

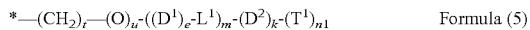

*—(CH$_2$)$_t$—(O)$_u$-((D$^1$)$_e$-L$^1$)$_m$-(D$^2$)$_k$-(T$^1$)$_{n1}$      Formula (5)

wherein * represents a portion of attaching to the siloxane polymer; $D^1$ and $D^2$ each independently represent an arylene group, a heteroarylene group, or a divalent alicyclic hydrocarbon group; $L^1$ represents a divalent linking group; $T^1$ represents an alkyl group, an alkoxy group, an alkoxycarbonyl group, an acryl group, an acyloxy group, a halogen atom, or a cyano group; t represents an integer of 2 to 20; u represents 0 or 1; e represents an integer of 1 to 3; m represents an integer of 1 to 3; k represents 1 or 2; n1 represents an integer of 1 to 5; and e×m+k is an integer of 2 to 5.

16. The cross-linked siloxane polymer according to claim 15, wherein the structure represented by the Formula (5) is a structure represented by one of the following formulae (6-1) to (6-12):

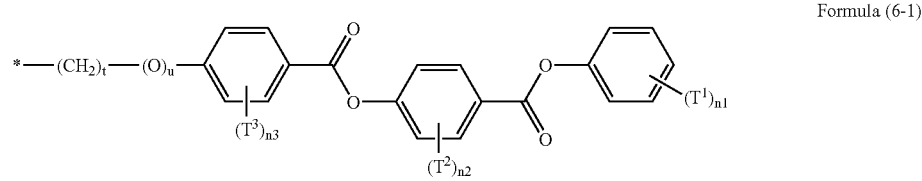

Formula (6-1)

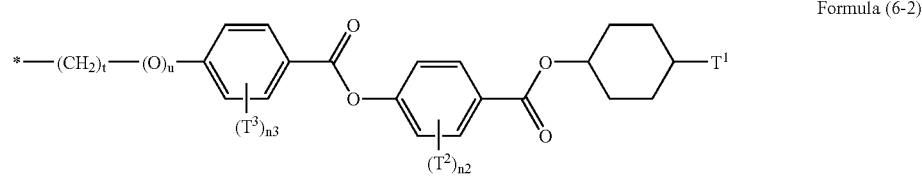

Formula (6-2)

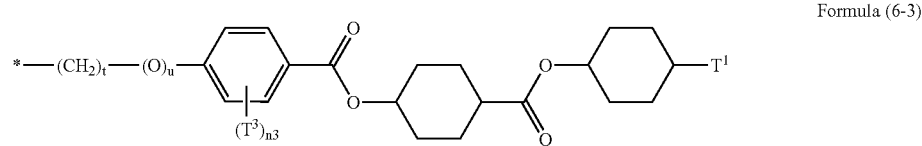

Formula (6-3)

-continued

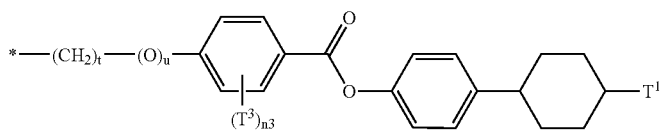
Formula (6-4)

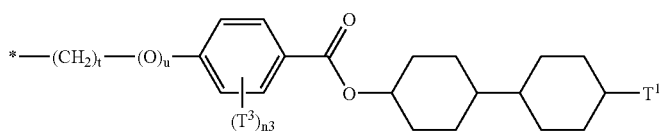
Formula (6-5)

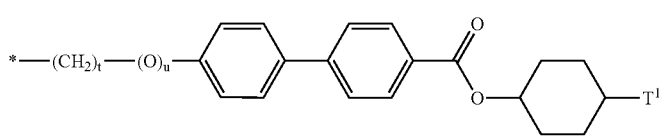
Formula (6-6)

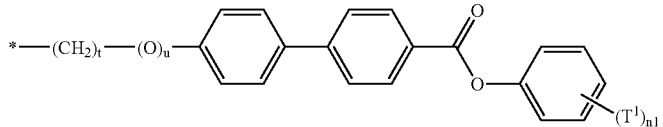
Formula (6-7)

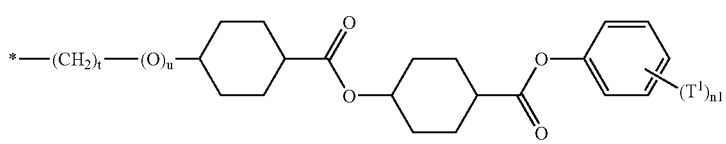
Formula (6-8)

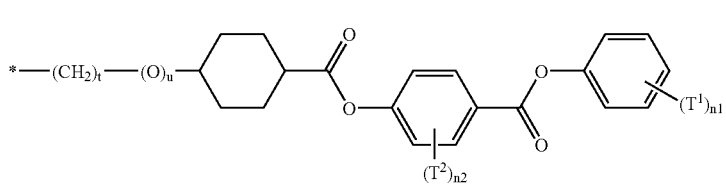
Formula (6-9)

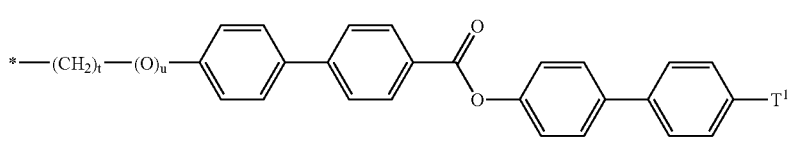
Formula (6-10)

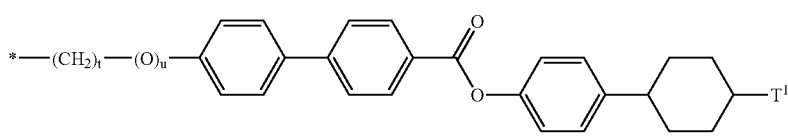
Formula (6-11)

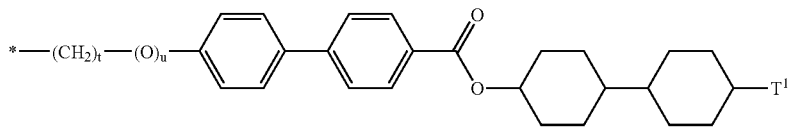
Formula (6-12)

wherein t, u, $T^1$, and n1 each have the same meaning as t, u, $T^1$, and n1, respectively, in the Formula (5); $T^2$ and $T^3$ each independently represent a halogen atom, a cyano group, an alkoxy group, and an alkyl group; and n2 and n3 each independently represent an integer of 1 to 4.

17. A liquid crystal composition comprising a cross-linked polymer having a liquid crystalline group in a side chain, a low molecular weight liquid crystal, and a dichroic dye, wherein the cross-linked siloxane polymer comprises a repeating unit represented by the following Formula (1):

Formula (1)

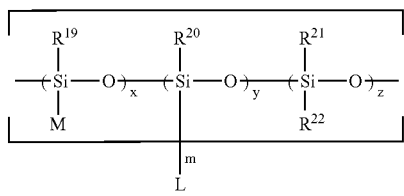

wherein $R^{19}$, $R^{20}$, $R^{21}$, and $R^{22}$ each independently represent an alkyl group or an aryl group; M represents a liquid crystalline group; L represents a cross-linking group; m represents an integer of 2 or larger; x represents a number from 1 to 100; y represents a number of 0.1 or larger; z represents a number of 0 or larger; and when x is 2 or larger, groups represented by M may be the same or different.

* * * * *